(12) United States Patent
Cortes

(10) Patent No.: US 12,520,919 B2
(45) Date of Patent: Jan. 13, 2026

(54) EYEWEAR PROTECTOR AND WRIST WRAP

(71) Applicant: Benjamin Cortes, Canyon Country, CA (US)

(72) Inventor: Benjamin Cortes, Canyon Country, CA (US)

( * ) Notice: Subject to any disclaimer, the term of this patent is extended or adjusted under 35 U.S.C. 154(b) by 166 days.

(21) Appl. No.: 18/622,922

(22) Filed: Mar. 30, 2024

(65) Prior Publication Data
US 2025/0302165 A1  Oct. 2, 2025

(51) Int. Cl.
| A45C 11/04 | (2006.01) |
| A45C 9/00  | (2006.01) |
| A45F 5/02  | (2006.01) |
| A45F 5/00  | (2006.01) |

(52) U.S. Cl.
CPC .............. *A45C 11/04* (2013.01); *A45C 9/00* (2013.01); *A45F 5/021* (2013.01); *A45F 2005/002* (2013.01); *A45F 2005/006* (2013.01); *A45F 2005/008* (2013.01); *A45F 5/1541* (2025.01)

(58) Field of Classification Search
CPC ... A45C 11/04; A45F 5/1541; A45F 2005/008
USPC .................................. 206/5; D3/265; 24/3.8
See application file for complete search history.

(56) References Cited

U.S. PATENT DOCUMENTS

| 4,951,811 A * | 8/1990 | Lines .................... A45C 11/046 206/5 |
| 4,953,695 A * | 9/1990 | Tallman ................. G02C 3/003 206/5 |
| 5,344,002 A * | 9/1994 | Baczkowski ........ G02C 13/006 206/5 |
| 5,593,024 A * | 1/1997 | Seiler ..................... G02C 3/003 206/5 |
| D414,603 S * | 10/1999 | Burchett ........................ D3/226 |
| 8,689,970 B2 * | 4/2014 | Stutzman ............... A45C 11/04 2/13 |
| 10,925,365 B2 * | 2/2021 | Jandali ................. A45C 7/0077 |
| D1,056,479 S * | 1/2025 | James ............................ D3/265 |

* cited by examiner

*Primary Examiner* — Scott T Mcnurlen

(57) ABSTRACT

An eyewear protector and wrist wrap used with conventional eyeglasses, sunglasses, or eyewear in general, which can hold eyewear of varying size and shape and is made of a soft stretchable material. The device construction prevents the temple pieces of the eyewear from coming into contact with the interior surface of the lenses. An elastic drawstring assures that the eyewear be contained within the device and allows for the entire package to be hung from a wrist or from a pant belt loop. The device can be folded and with the aid of a strap having a fastener at one end which can engage with a fastener on the device, can be worn on a wrist as a wrist wrap. The device can be produced in countless colors and have logo labels or any matter of design placed onto it which is visible during both functions.

16 Claims, 18 Drawing Sheets

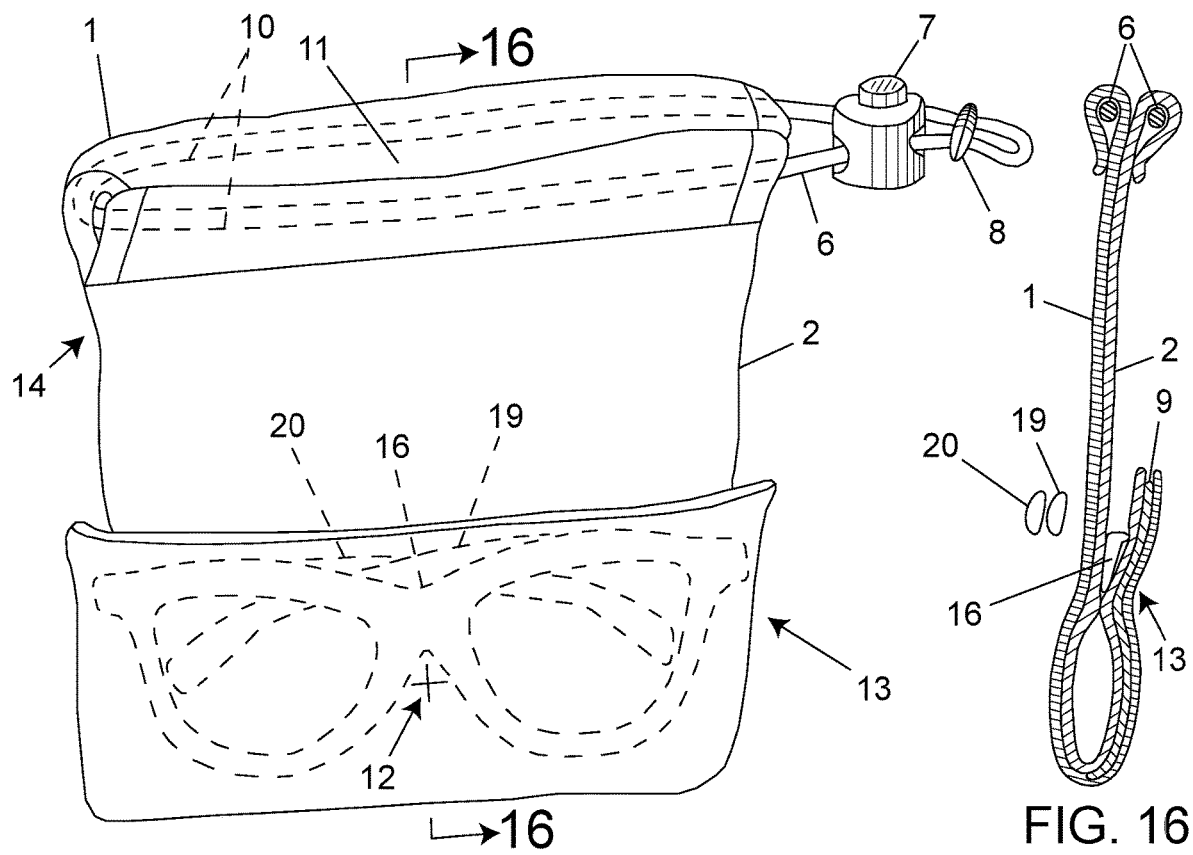
FIG.15
FIG. 16
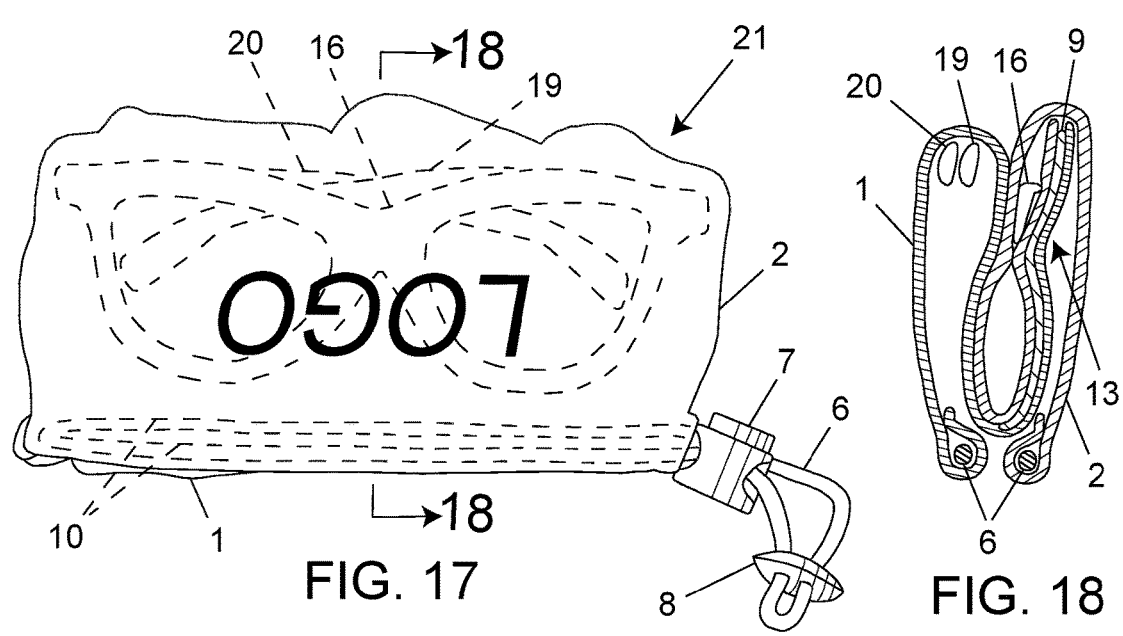
FIG. 17
FIG. 18

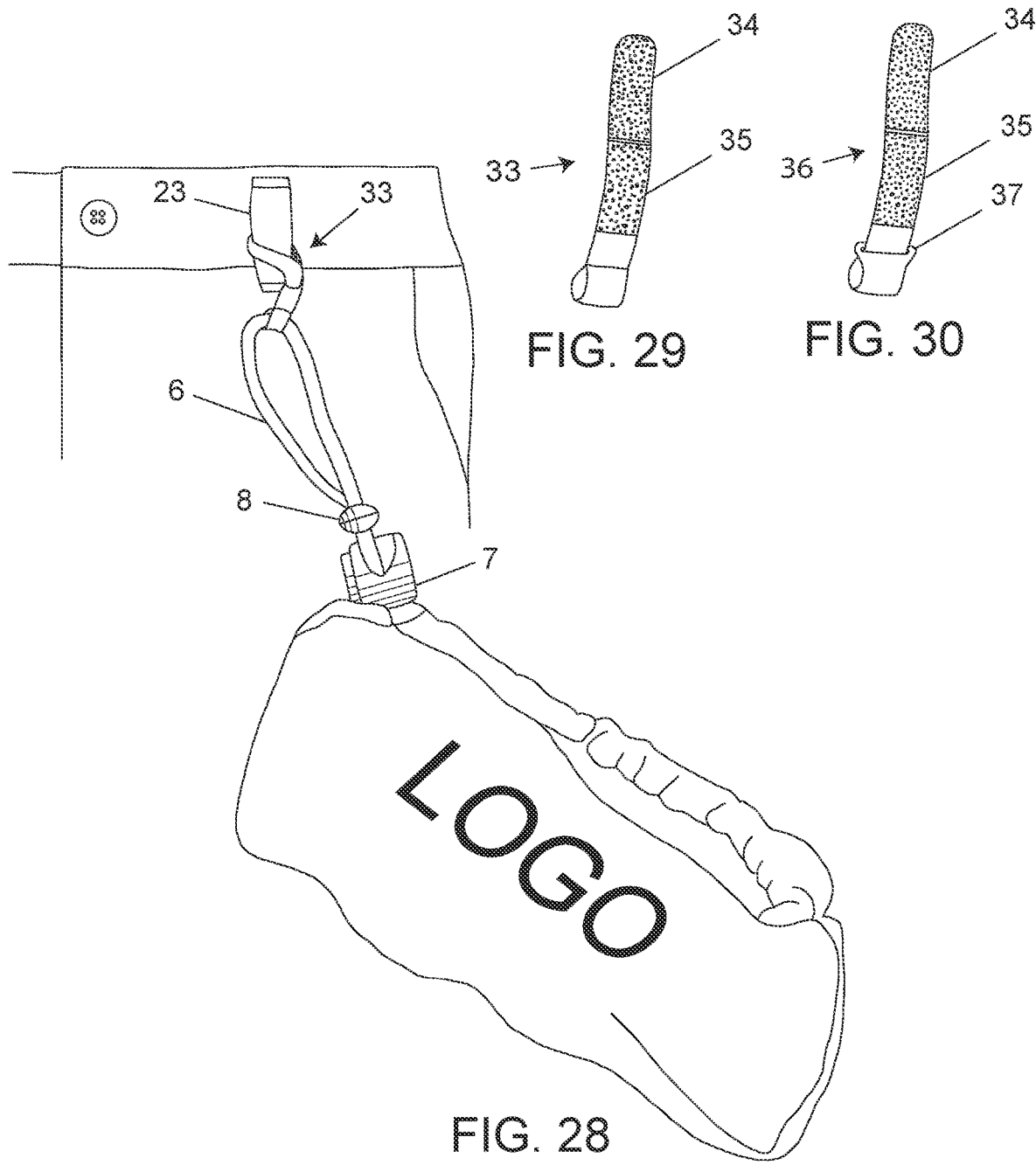

EYEWEAR PROTECTOR AND WRIST WRAP

BACKGROUND OF THE INVENTION

The invention is generally directed to eyeglasses, sunglasses or related eyewear and more specifically, to eyeglass protectors.

It has been desirable for many years to have a device which can retain eyeglasses, sunglasses or eyewear in general, about the body, thereby eliminating the need for storage in pockets or bags while also serving to protect them from abrasion; a device which prevents the temple pieces of eyewear from coming into contact with the interior surface of the lenses and scratching them. A device which can accommodate a large assortment of eyewear, that can be used to clean eyewear lenses and can be worn as a fashion accessory when not protecting eyewear.

A number of retainer devices are shown in the patent literature that permit eyewear to be kept about the body when not in use but which allow the user to easily place eyewear in an operative position. See, for example, U.S. Pat. No. 2,539,922 issued Jan. 30, 1951 to Nyberg for "Spectacle Neck Support" which employs a retainer with connections to eyewear temple pieces that are used to support the eyewear about the neck; U.S. Pat. No. 4,133,604 issued Jan. 9, 1979 to Fuller for "Eyeglass Retainer" utilizes and elastomeric tube that is comprised within a head band and consists of tubular members that slip over temple pieces for retaining eyeglasses in place on the head when in operative position but also permits eyeglasses to be pushed up to the forehead when not in use. This device can also be used as a neck strap although it is not primarily designed for supporting the eyeglasses when removed from the eyes.

In U.S. Pat. No. 5,102,216 issued Apr. 7, 1992 to Michell for "Eyeglass Retainer And Case" an eyeglass retainer is made by utilizing tubular straps that attach to the stems of eyeglasses and which are sewn to a double rolled piece of stretch fabric. When the eyeglasses are being utilized they can be retained around the head and when they are not being utilized the eyeglasses can be placed within the protective case made by the double rolled stretch fabric. This combination device adds another element to eyeglass retainers; the ability to store and protect eyeglasses using a component of the retainer.

A protective device which maintains a constant association of eyeglass case and eyeglasses is shown in U.S. Pat. No. 4,953,695 issued Sep. 4, 1990 to Tallman for "Protective Cover For Eyeglasses". The device is a tubular member which is slipped over one of the temple pieces of the eyeglasses and onto the lenses thereby serving as a protective cover. While this cover is being utilized, a retainer connected to the temple pieces allows the eyeglasses to hang from the wearer's neck. To use the eyeglasses the protective cover is slipped along one of the temple pieces and onto the eyeglass retainer cord. The eyeglasses can then be utilized while the protective cover is held on the eyeglass retainer cord and sits at the wearer's back just below the neck.

An eyeglass protective cover is made part of an eyeglass retainer in U.S. Pat. No. 5,593,024 issued Jan. 14, 1997 to Seiler for "Eyeglass Retainer and Protective Cover". This device combines a protective cover with an eyeglass retainer and allows the eyeglasses to be placed in the protective cover without removing the elements which couple the device to the eyeglasses.

Another protective device for eyewear is provided by the use of "hard" spectacle cases. U.S. Pat. No. 4,401,209 issued Aug. 30, 1983 to Salmond et al. for "Spectacle Case" comprises a design which prevents the temple pieces of the spectacles from coming into contact with the interior surface of the lenses when eyewear is stored in the case. In this way any possible scratching caused by the temple pieces rubbing against the interior surface of the lenses is prevented.

U.S. Pat. No. 3,819,033 issued Jun. 25, 1974 to Hueber for "Expandable Spectacle Case" relates to a "soft" spectacle case which is made with an inner lining of elastic material. This elastic material allows the case to expand and enables the case to accommodate eyeglasses of varying sizes.

A "Lens Shield Portable Eyeglasses Fashion Accessory Case" is shown in Patent Application Publication No. US2014/0138264A1 for patent application made by Rouzeau and published May 22, 2014. The case consists of top and bottom half panels of material which are folded over along a middle horizontal axis and slide over the front and back sides of the lenses of a frame. The "soft" case itself can be used as a tool to clean the eyeglass lenses and when the eyeglasses are encased within it a clip allows the user to wear the case as a fashion accessory and thereby eliminate the need for storage in a pocket or bag.

Finally, Patent Application Publication No. US2018/0368546A1, published Dec. 27, 2018 for patent application made by Ceccarelli relating to a "Portable Eyeglass Case" discloses a case which is attached to eyeglasses and contains a protective film that can expand to cover and protect the lenses and retracts into the case when not in use. Additionally the protective film can be printed with a logo which is visible when the film is expanded to protect the lenses.

While the devices disclosed in the aforementioned Patents and Patent Application Publications provide valuable services to the user of eyewear, all of them exhibit at least one or a few of the following use disadvantages:

The device only provides retention but does not provide protection of the eyewear.

The device does not provide a method to clean eyewear lenses.

The hanging of eyewear about the neck with the use of the device may be undesirable.

The device does not function to store eyewear.

The user is required to store the device and eyewear in a pocket or bag.

The eyewear temple pieces need to be disconnected from the retainer connection means in order for the eyewear to be placed in the protective case formed by the device.

The device does not prevent the eyewear temple pieces from coming into contact with the interior surface of the lenses and scratching them.

A retainer cord is required for the use of the device.

The device cannot accommodate eyewear of varying sizes.

The device cannot be used as a fashion accessory.

The device may become detached and lost when clip it utilizes to attach to clothing is pulled off.

The printed logo on the device is only visible when the device is engaged in a protective function.

A protective device which allows eyewear to be retained from the wrist or clothing and which also overcomes these disadvantages would represent a significant advance in this art.

SUMMARY OF THE INVENTION

The present disclosure includes an eyewear protector and wrist wrap combination configured to protectively hold eyewear of the type having a frame, lenses and a pair of temple pieces coupled to the frame. In some embodiments the eyewear protector and wrist wrap is constructed from two sheets of fabric that are attached to each other along edges while an edge of the sheets is unattached and forms an opening which leads to a pocket that can be turned inside out and pulled down and over a receptacle portion into which eyewear may be introduced. This receptacle was created by placing and attaching a strip of fabric between both sheets of fabric along the edge opposite the opening and then folding up and attaching this edge through all fabric layers.

The eyewear protector and wrist wrap can include a double barrel slider and clamp slidably received along an elastic cord and this elastic cord is introduced along a seam created along the opening that leads to the pocket. The seam is created by folding each unattached edge of each sheet down and over the cord and attaching each edge onto its corresponding sheet. Adjustment of the double barrel slider and clamp along the elastic cord as well as movement of the elastic cord along the seam allows for selectively closing the opening and preventing the eyewear from escaping the eyewear protector. Additionally, a strap with fasteners is slidably received along the elastic cord. This strap can be looped around a pant belt loop and the fasteners brought into contact and engaged with each other allowing the eyewear contained within the eyewear protector to be hung from a pant belt loop. The elastic cord can also be looped around a wrist and the position of the clamp and double barrel slider adjusted to allow the eyewear contained within the eyewear protector to hang from the wrist.

In some embodiments a strap with a fastener is attached between both sheets of fabric. This strap with fastener is disposed to allow the fastener to contact and engage with a fastener attached to one of the sheets of fabric. Therefore, when the component containing the elastic cord is folded down over the receptacle portion, the product can be draped over a wrist and the fasteners brought into contact and engaged with each other allowing the device to be worn as a wrist wrap.

Both sides of the sheets of fabric can have logos, arts or other decorative patterns placed onto them and these can also be included in any other components of the eyewear protector and wrist wrap.

In some embodiments a strap with fasteners that are engageable with each other is attached between both sheets of fabric. An elastic loop is attached between both sheets of fabric on the edge opposite to the edge with the attached strap with fasteners. The strap is disposed to allow it to pass through the elastic loop. Therefore, when the component containing the elastic cord is folded down over the receptacle portion, the product can be draped over a wrist, the strap is passed through the elastic loop and pulled back and over the elastic loop and the fasteners are brought into contact and engaged with each other allowing the device to be worn as a wrist wrap.

In some embodiments a stretchable band is attached between both sheets of fabric and to this stretchable band is attached a strap with fasteners that are engageable with each other. An elastic loop is attached between both sheets of fabric on the edge opposite to the edge with the attached stretchable band and strap with fasteners. The stretchable band and strap with fasteners is disposed to allow it to pass through the elastic loop. Therefore, when the component containing the elastic cord is folded down over the receptacle portion, the product can be draped over a wrist and the stretchable band with the strap and fasteners is passed through the elastic loop and pulled back and over the elastic loop after which the fasteners are brought into contact and engaged with each other allowing the device to be worn as a wrist wrap. The stretchable band allows the device to be worn as a wrist wrap on wrists of varying thickness.

In some embodiments a stretchable band is attached between both sheets of fabric and to this stretchable band is attached a strap with a fastener. This stretchable band and strap with fastener is disposed to allow the fastener on the strap to contact and engage with a fastener attached to one of the sheets of fabric. Therefore, when the component containing the elastic cord is folded down over the receptacle portion, the product can be draped over a wrist and the fasteners brought into contact and engaged with each other allowing the device to be worn as a wrist wrap. The stretchable band allows the device to be worn as a wrist wrap on wrists of varying thickness.

The disclosure also includes an eyewear protector and wrist wrap device configured to protectively hold eyewear of the type having a frame, lenses and a pair of temple pieces coupled to the frame. The eyewear protector and wrist wrap may be constructed from a singular sheet of fabric that is folded along a midpoint, a strip of fabric is introduced and attached within this fold and the meeting edges of the folded sheet are attached to each other while the edges opposite to the edge containing the strip of fabric are left unattached and form an opening that leads to a pocket that can be turned inside out and pulled down and over a receptacle portion into which eyewear may be introduced. This receptacle was created by folding up the edge containing the strip of fabric and attaching this edge through all fabric layers. The eyewear protector and wrist wrap can also include a closure cooperating with the unattached edges to selectively prevent removal of the eyewear.

In some embodiments the closure includes a double strand slider and a cord lock slidably received along an elastic cord and into contact with the eyewear protector. The elastic cord is introduced along a seam created by folding the edge of the front and rear panels of the singular sheet of fabric, at the opening, down and over the elastic cord and attaching each edge onto its corresponding panel. The elastic cord can move freely within the seam and be looped around a wrist and the position of the double strand slider and cord lock can be adjusted to hang the eyewear protector which contains eyewear from a wrist. A strap having fasteners attached is slidably received along the cord and can be looped around a pant belt loop and the fasteners brought into contact and engaged with each other allowing the eyewear protector which holds eyewear to hang from a pant belt loop.

Also in some embodiments a strap with a fastener is attached between the front and rear panels of the singular sheet of fabric. This strap is disposed to allow the fastener to contact and engage with the fastener attached to one of the panels. Therefore, when the component containing the elastic cord is folded down over the receptacle portion, the product can be draped over a wrist and the fasteners brought into contact and engaged with each other allowing the device to be worn as a wrist wrap.

Both sides of the front and rear panels of the singular sheet of fabric can have logos, arts or other decorative patterns placed onto them and these can also be included in any other components of the device.

In some embodiments a strap with fasteners that are engageable with each other is attached between the front and rear panels of the singular sheet of fabric. Also in some embodiments an elastic loop is attached between the front and rear panels of the singular sheet of fabric on the edge opposite to the edge with the attached strap with fasteners.

The strap is disposed to allow it to pass through the elastic loop. Therefore, when the component containing the elastic cord is folded down over the receptacle portion, the product can be draped over a wrist, the strap is passed through the elastic loop and pulled back and over the elastic loop and the fasteners are brought into contact and engaged with each other allowing the device to be worn as a wrist wrap.

In some embodiments a stretchable band is attached between the front and rear panels of the singular sheet of fabric and to this stretchable band is attached a strap with fasteners that are engageable with each other. An elastic loop is attached between the front and rear panels of the singular sheet of fabric on the edge opposite to the edge with the attached stretchable band and strap with fasteners. The stretchable band and strap with fasteners is disposed to allow it to pass through the elastic loop. Therefore, when the component containing the elastic cord is folded down over the receptacle portion, the product can be draped over a wrist, the stretchable band with the attached strap is passed through the elastic loop and pulled back and over the elastic loop and the fasteners are brought into contact and engaged with each other allowing the device to be worn as a wrist wrap. The stretchable band allows the device to be worn as a wrist wrap on wrists of varying thickness.

In some embodiments a stretchable band is attached between the front and rear panels of the singular sheet of fabric and to this stretchable band is attached a strap with a fastener. This stretchable band and strap with fastener is disposed to allow the fastener on the strap to contact and engage with a fastener attached to one of the panels of the singular sheet of fabric. Therefore, when the component containing the elastic cord is folded down over the receptacle portion, the product can be draped over a wrist and the fasteners brought into contact and engaged with each other allowing the device to be worn as a wrist wrap. The stretchable band allows the device to be worn as a wrist wrap on wrists of varying thickness.

BRIEF DESCRIPTION OF THE DRAWINGS

FIG. 15 is a perspective view showing the front side of FIG. 14 with the eyewear placed fully within the receptacle of the eyewear protector.

FIG. 16 is a sectional view of FIG. 15 taken generally along the line 16-16 showing the position of the eyewear and the eyewear temple pieces in relation to the components that make up the eyewear protector.

FIG. 17 is a perspective view showing that the component of the sheets of fabric with the elastic cord as was presented in FIG. 15 has been turned inside out and brought down and over the portion holding the eyewear thereby enveloping the eyewear in a protective package.

FIG. 18 is a sectional view of FIG. 17 taken generally along the line 18-18 showing the movement of the component of the sheets of fabric with the elastic cord as it was turned inside out and was brought down and over the portion containing the eyewear.

FIG. 28 is a perspective view showing the eyewear protector containing eyewear as it is worn from a pant belt loop with the aid of a strap held from the elastic cord.

FIG. 29 and FIG. 30 are perspective views showing two types of straps having two mutually engageable fasteners that may be utilized to wear the eyewear protector containing eyewear from a pant belt loop as presented in FIG. 28.

DETAILED DESCRIPTION OF THE INVENTION

Figure 1:
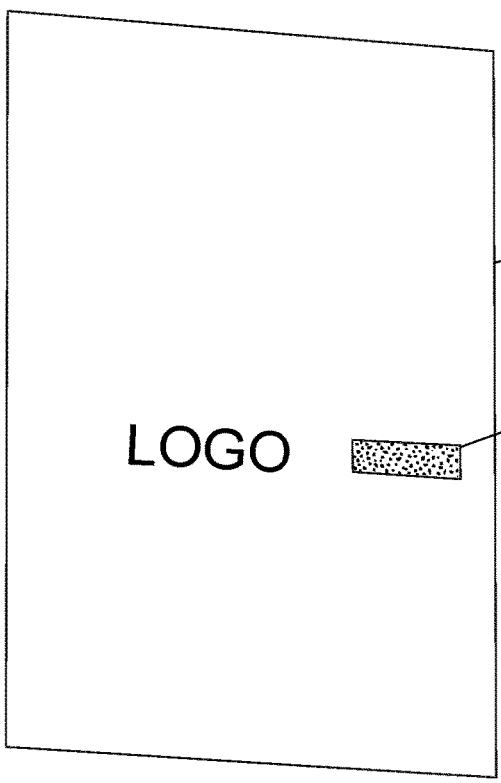
FIGS. 1 and 2 are perspective views showing both sides of a sheet of fabric with attention paid to the placement of a fastener and logos.

The material used for the construction of the eyewear protector and wrist wrap should be a soft cloth or fabric which is also strong, stretchable, washable, quick drying and does not scratch eyewear lenses. A cloth or fabric that is well suited for cleaning eyewear lenses. The description of the eyewear protector and wrist wrap will use the word sheet of fabric but it is to be understood that this can be any material which can be reliably employed containing the characteristics just stated. The materials used can be variable and construction of the device should not be held to conform to the use of a specific material type. Also important to note is that the eyewear with which the device may be used can be any of the variety known in the art and includes prescription eyeglasses, sun glasses, safety glasses and the like. While it may be necessary to use elastic cord, this should not preclude the use of non-elastic cord if so desired. Given that the device can be worn on the wrist as a wrist wrap, the variety of colors and textures utilized for its construction can be seemingly endless.

LIST OF REFERENCE NUMERALS

Figure 2:
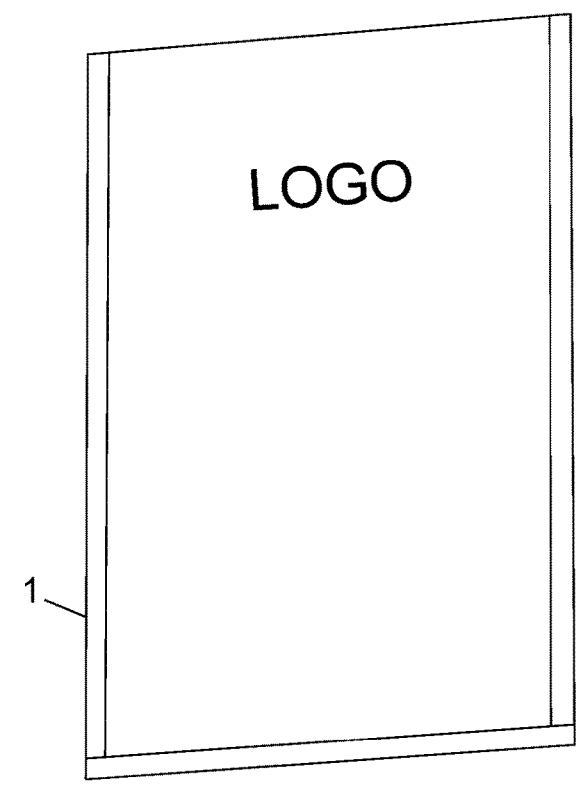

1—First sheet of fabric
2—Second sheet of fabric
3—First fastener
4—Second fastener
5—Strap
6—Elastic cord
7—Cord lock
8—Double barrel slider
9—Strip of fabric
10—Seam
11—Opening
12—Fold attachment
13—Receptacle
14—Component containing elastic cord
15—Wrist wrap
16—Pair of eyewear
17—First lens
18—Second lens
19—First temple piece
20—Second temple piece
21—Eyewear protector
22—Carabiner
23—Pant belt loop
24—Singular sheet of fabric
25—Front fabric panel
26—Rear fabric panel
27—Elastic cord loop
28—Alternative first fastener
29—Alternative second fastener
30—Alternative fold attachment
31—Alternative strap
32—Elastic band
33—Pant belt loop strap
34—Pant belt loop strap first fastener
35—Pant belt loop strap second fastener
36—Alternative pant belt loop strap
37—Alternative pant belt loop strap eyelet The first embodiment of the eyewear protector and wrist wrap follows from FIG. 1 to FIG. 20. FIGS. 1 and 2 show both sides of first sheet of fabric 1 along with the placement of logos. As can be seen in FIG. 2 the sheet is hemmed on three of its edges for sizing purposes as well as to create straight edges. The preferred method of hemming would be by sewing but may also occur by gluing or any other method which may be used to bring about the same results. Additionally, one side of the sheet has first fastener 3 attached to it. The preferred method of attaching first fastener 3 would be by sewing but may also be accomplished by gluing or any other method which would permanently place it on first sheet of fabric 1. Thus anytime "attaching" or any of its forms is mentioned it is to be understood that sewing is preferred but gluing or any other method that permanently places that which is being attached is acceptable.

Figure 3:
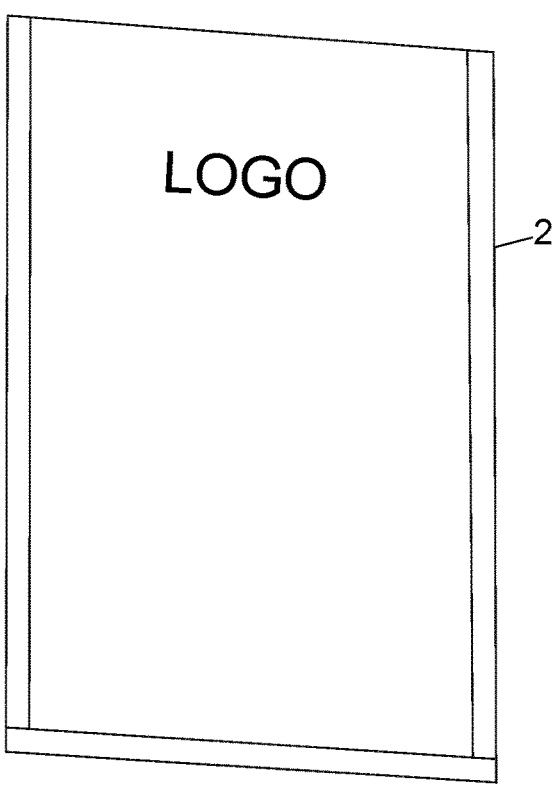
FIGS. 3 and 4 are perspective views showing both sides of a sheet of fabric with attention paid to the placement of a logo.
Figure 4:
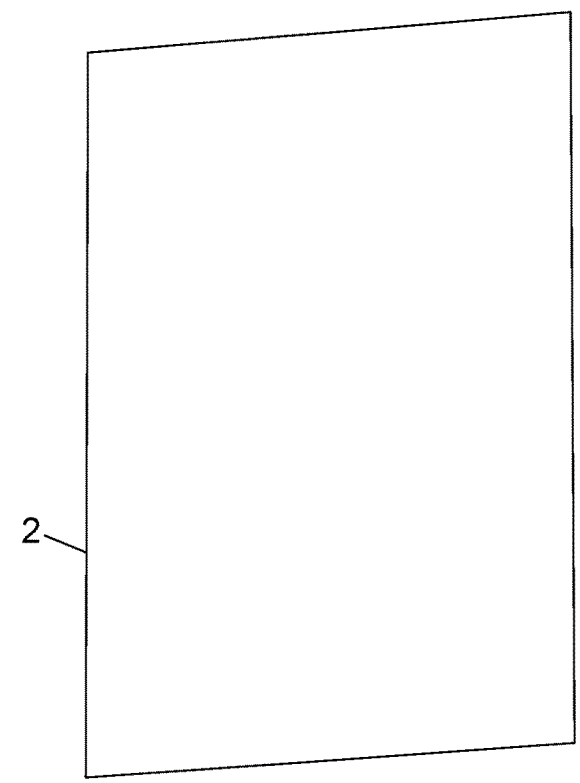

Both sides of second sheet of fabric 2 are presented in FIG. 3 and FIG. 4. FIG. 3 shows that this sheet is also hemmed on three of its edges for sizing purposes as well as to create straight edges. Again, the preferred method of hemming would be by sewing but may also occur by gluing or any other method which may be used to bring about the same results. Second sheet of fabric 2 has a logo placed on the side the edges are hemmed. When hemmed, first sheet of fabric 1 and second sheet of fabric 2 will be of the same dimension.

Figure 5:
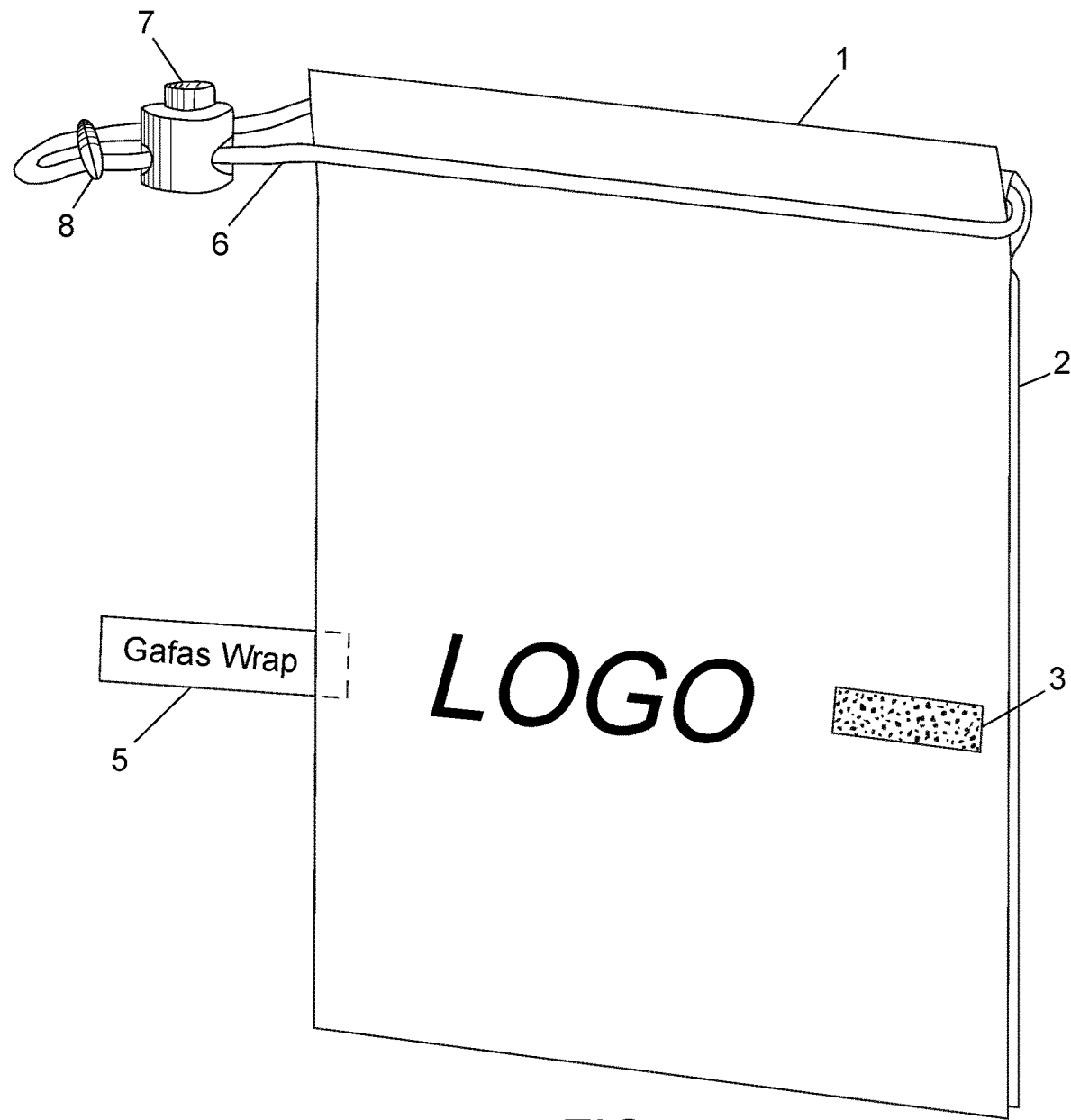
FIG. 5 is a perspective view showing two sheets of fabric with the same dimensions, oriented as presented in FIG. 1 and FIG. 3 and placed edge to edge. An elastic cord containing a clamp or cord lock and a double strand slider or double barrel slider is added and a strap is placed between both sheets of fabric.

FIG. 5 shows first sheet of fabric 1, which has a logo and first fastener 3 as was presented in FIG. 1. This sheet is placed so that it meets edge to edge with second sheet of fabric 2 as was presented in FIG. 3. Strap 5 is attached in place between both sheets of fabric. Elastic cord 6 has cord lock or clamp 7 (which is of the type such as spring clamp biased in a closed position) and a double barrel slider or double strand slider 8. Elastic cord 6 is introduced around the top edge of first sheet of fabric 1 and second sheet of fabric 2.

Figure 6:
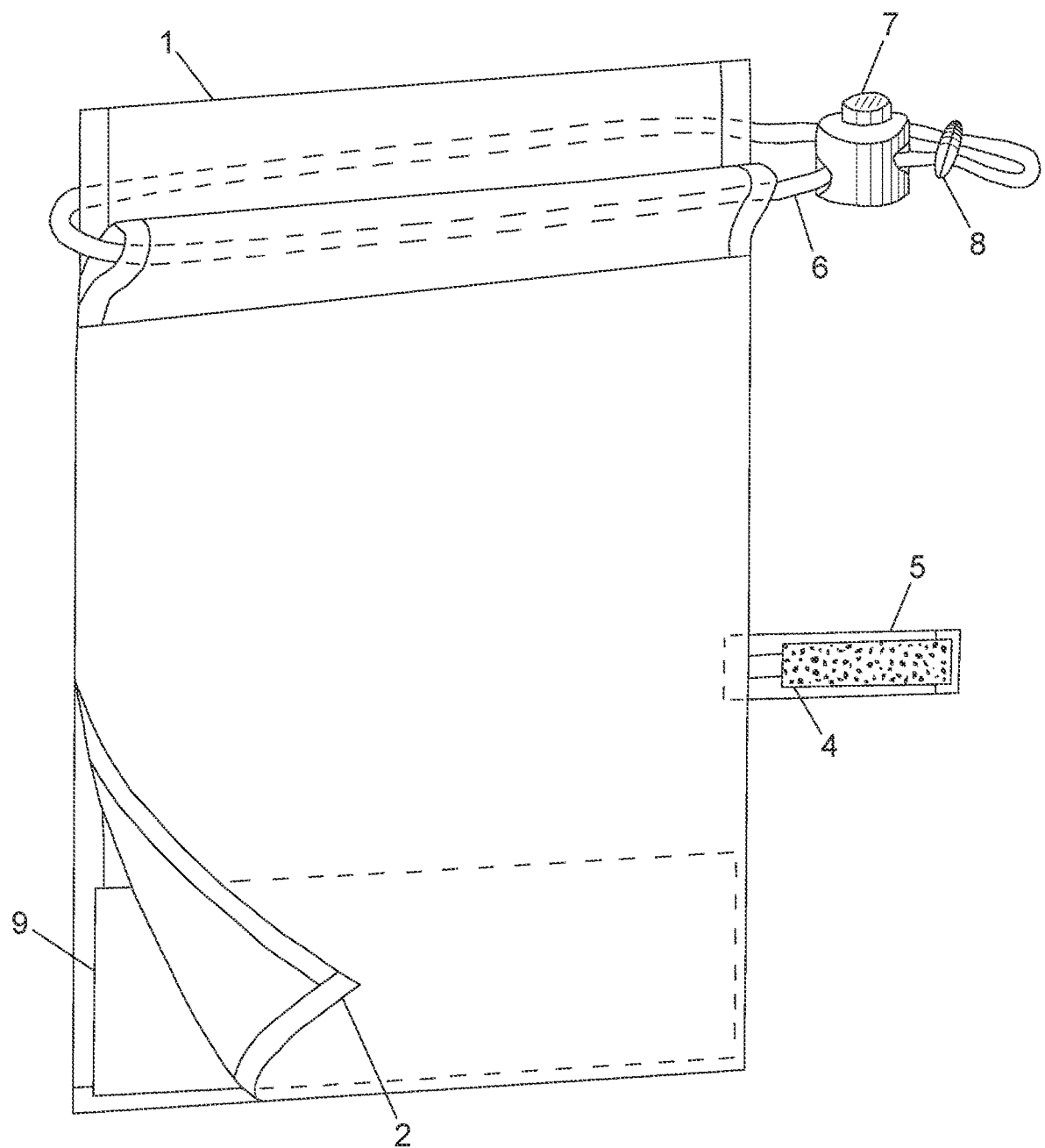
FIG. 6 is a perspective view showing the addition of an elastic cord along one corresponding edge of the sheets of fabric, a strap having a fastener attached placed between both sheets of fabric and a strip of fabric placed between both sheets of fabric along the edge opposite the edge with the elastic cord.

FIG. 6 shows the other side of FIG. 5. Elastic cord 6 with cord lock 7 and double barrel slider 8 is integrated onto the top un-hemmed edge of first sheet of fabric 1 and second sheet of fabric 2 by placement around both sheets and a portion of the un-hemmed edge of second sheet of fabric 2 is brought down and over elastic cord 6 and then attached to itself along the entire width of the sheet. Second fastener 4 is attached to strap 5 and strip of fabric 9 is introduced between first sheet of fabric 1 and second sheet of fabric 2. Strip of fabric 9, which can vary in thickness, will give structure and provide padding when the device holds eyewear. Additionally, hollow plastic tubes or other accessories can be introduced within this strip of fabric providing water buoyancy for use of the device in water activities but plastic tubes and other accessories may also be introduced within one or both sheets of fabric provided they do not scratch the eyewear lenses and the ability of the sheets of fabric to be utilized for the cleaning of eyewear lenses is not limited.

Figure 7:
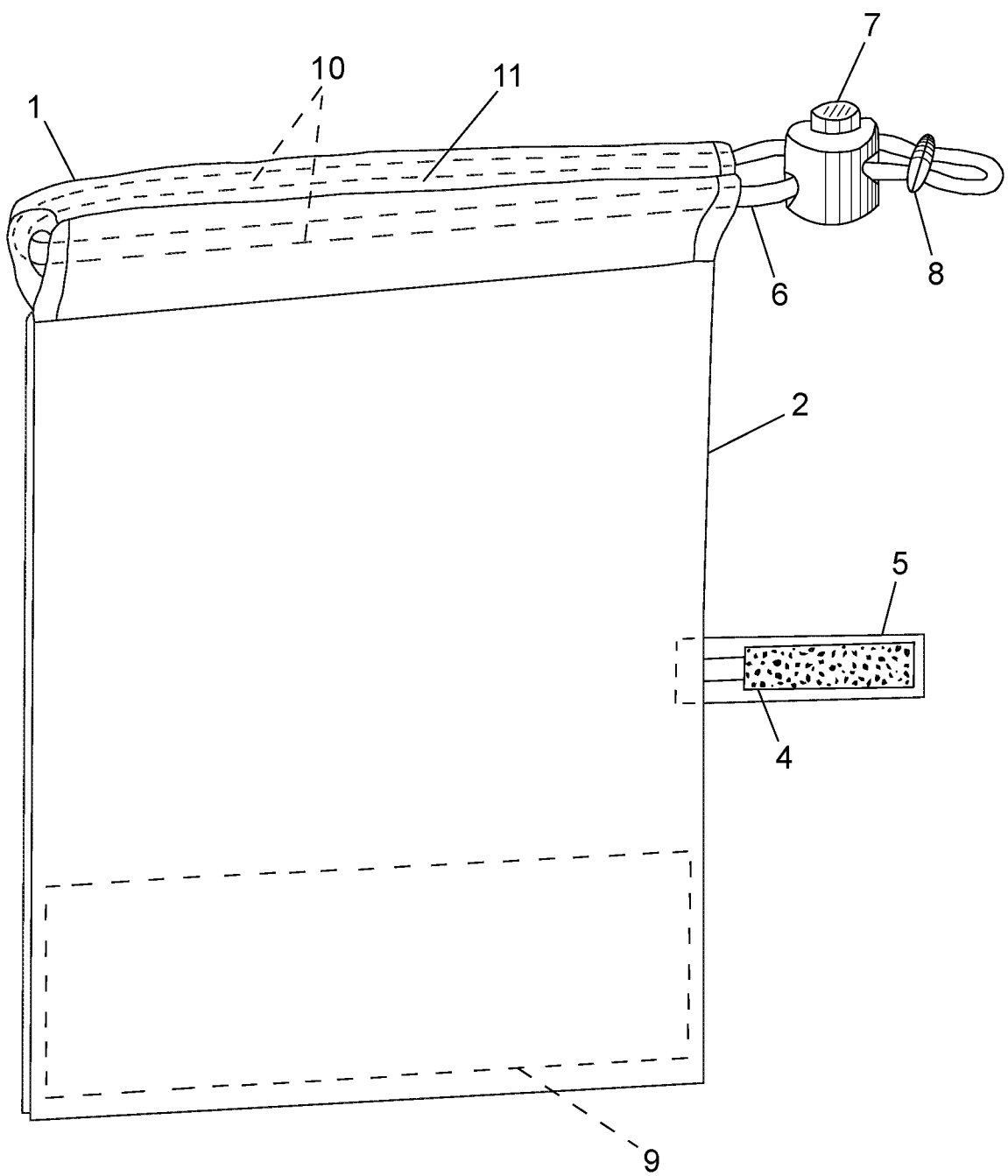
FIG. 7 is a perspective view showing the creation of a seam along which the elastic cord is free to move as well as the position of a strip of fabric placed between both sheets of fabric.

In FIG. 7 although only partially visible, the un-hemmed edge of first sheet of fabric 1 (like that of second sheet of fabric 2) was brought down and over elastic cord 6 and then attached to itself along the entire width of the sheet. These actions created seam 10, within which elastic cord 6 is free to move. Also created is opening 11 which leads to a pocket formed when first sheet of fabric 1 and second sheet of fabric 2 were attached to each other along the hemmed edges and strip of fabric 9 was set in place between both sheets and was attached to one or both sheets.

Figure 8:
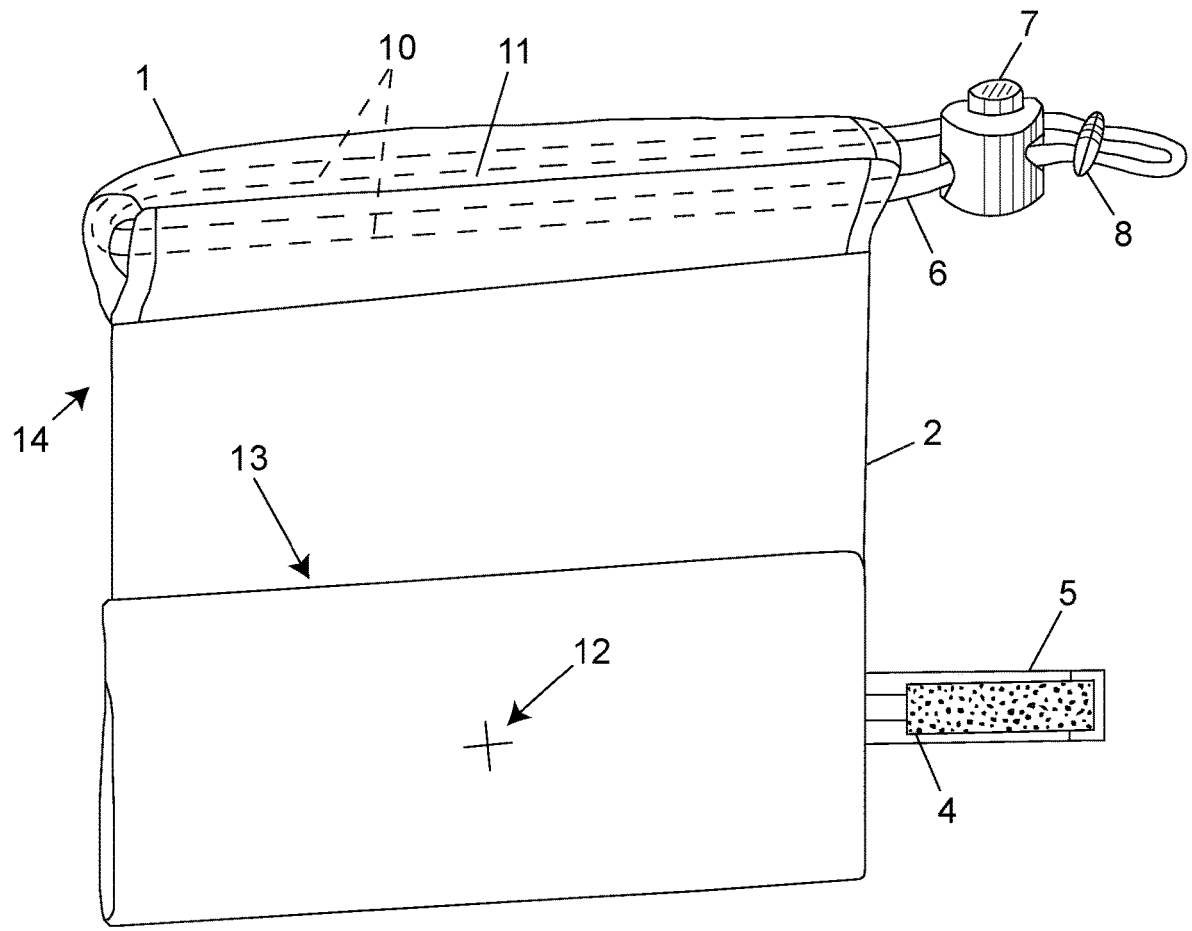
FIG. 8 is a perspective view of an eyewear protector and wrist wrap made by folding up the portion of the sheets of fabric containing the strip of fabric as presented in FIG. 7 and attaching this portion all the way through all fabric layers.
Figure 9:
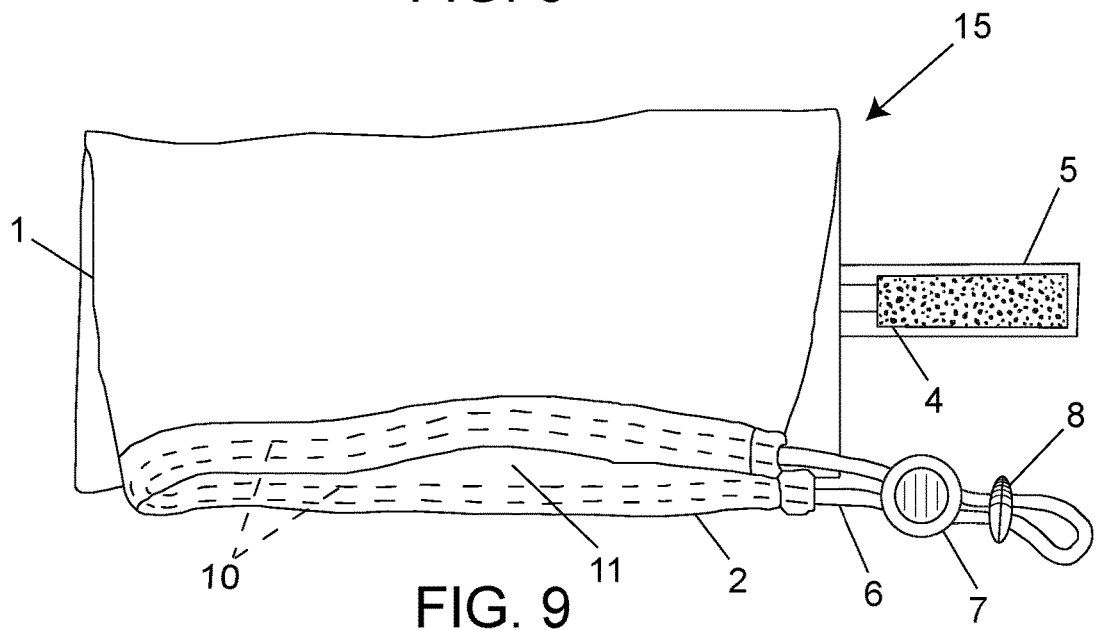
FIG. 9 is a perspective view showing that the component of the eyewear protector and wrist wrap with the elastic cord as presented in FIG. 8 is folded down in order to transform the eyewear protector and wrist wrap into a wrist wrap.

FIG. 8 is a continuation of FIG. 7 and shows a completed eyewear protector and wrist wrap. At this point the portion of attached first sheet of fabric 1 and second sheet of fabric 2 which contains strip of fabric 9 introduced between them as set forth in FIG. 6 is folded up and attached through all layers of fabric at fold attachment 12. This action creates receptacle 13 which will serve as the introduction point of eyewear, when the eyewear protector function is desired. For the purpose of clarity strip of fabric 9 will not be shown in some of the following drawings, but should be understood as existing within the folded and attached portion of first sheet of fabric 1 and second sheet of fabric 2.

At this point the completed eyewear protector and wrist wrap may be utilized as an eye wear protector or as a wrist wrap. First we will look at how it is utilized as a wrist wrap but FIG. 8 will also be our starting point for utilizing it as an eyewear protector. In order to transform the eyewear protector and wrist wrap into a wrist wrap the component containing elastic cord 14 as presented in FIG. 8 is folded down over receptacle 13 bringing us to FIG. 9. The device now exists as wrist wrap 15.

Figure 10:
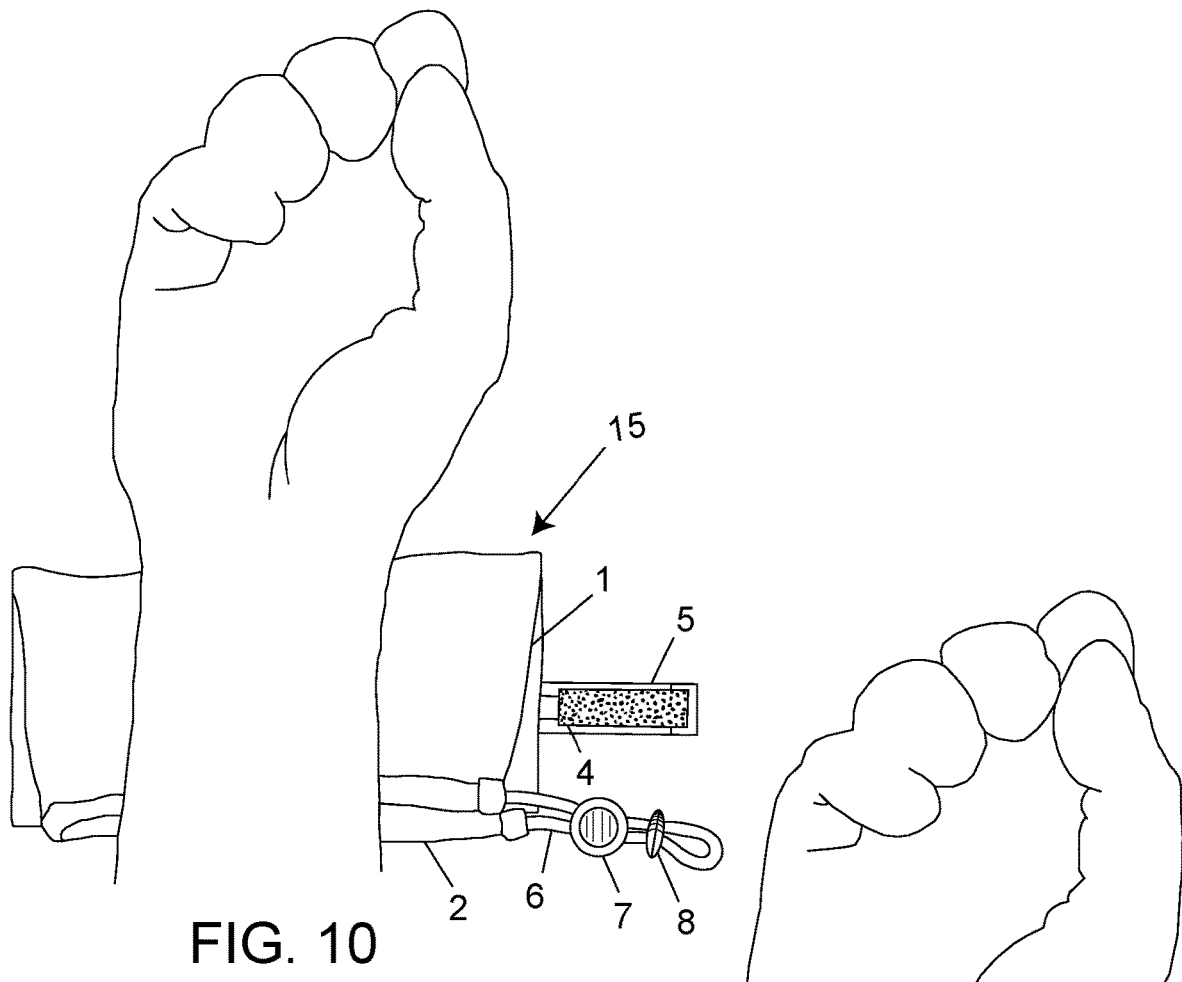
FIGS. 10 and 11 are perspective views showing how the wrist wrap is placed on one side of the wrist and the fastener on the strap is engaged with the fastener attached to the sheet of fabric as was established in FIG. 1 thereby securing the wrist wrap about the wrist.
Figure 11:
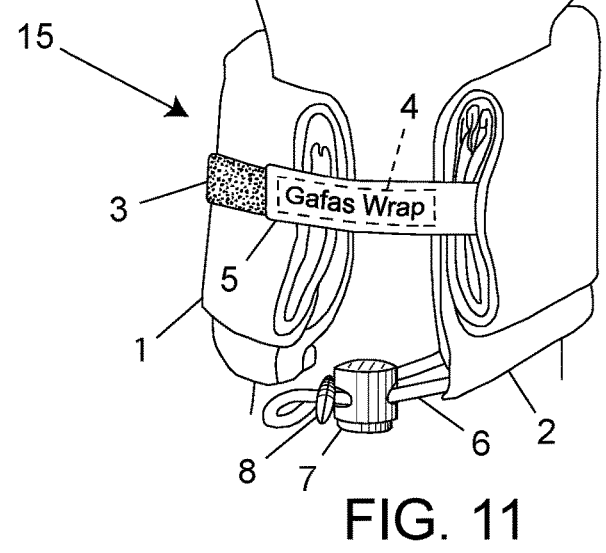
Figure 12:
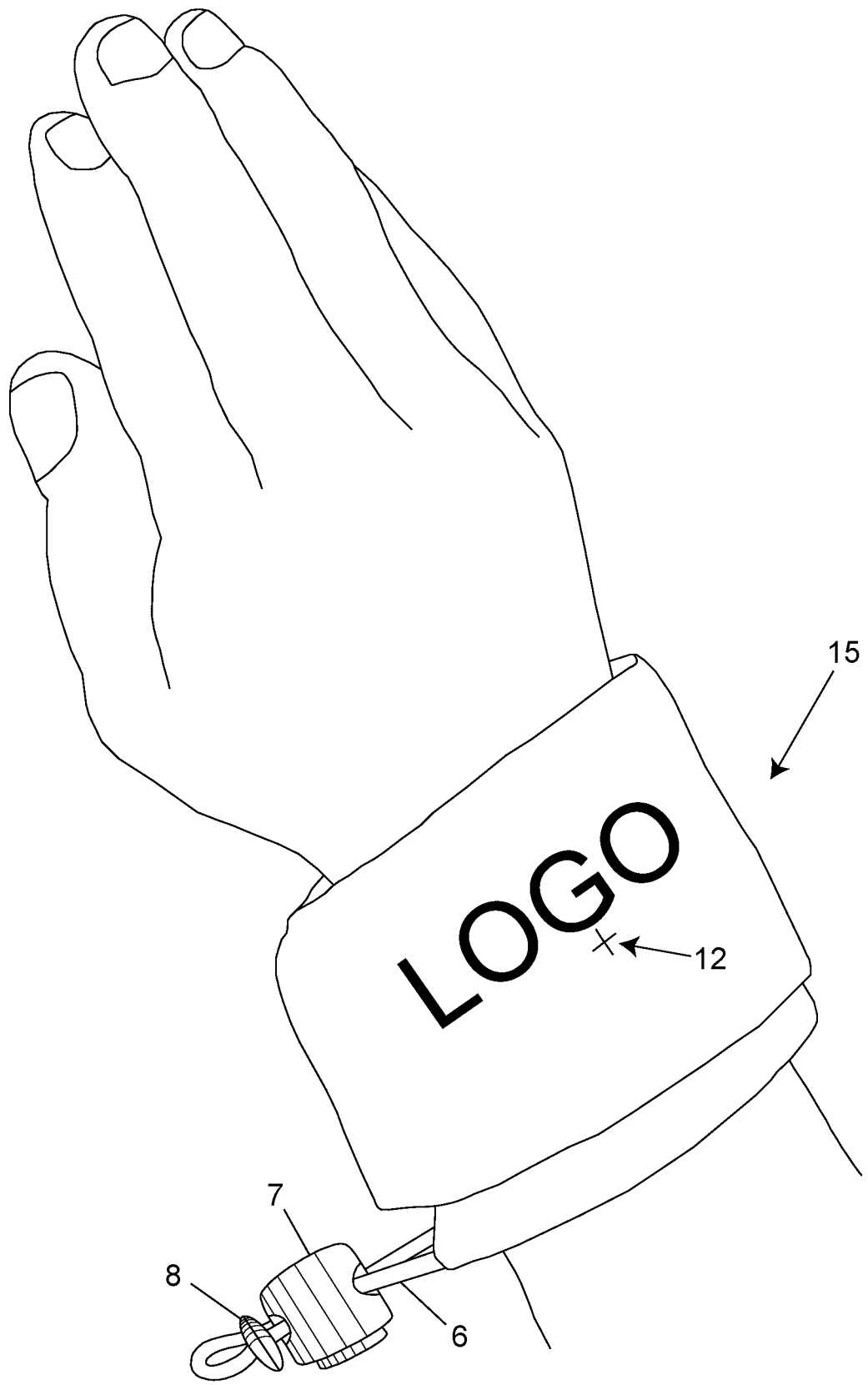
FIG. 12 is a perspective view showing that given the placement of the logo on one of the sheets of fabric as presented in FIG. 1, this logo is now visible as the wrist wrap is worn about the wrist.

FIG. 10 shows the placement of wrist wrap 15 on one side of a wrist. FIG. 11 shows that wrist wrap 15 is manipulated in a way that brings second fastener 4 in contact with first fastener 3 and these fasteners engage with each other. The result is that wrist wrap 15 is secured around the wrist. FIG. 12 shows that the logo on first sheet of fabric 1 as was presented in FIG. 1 is now visible when wrist wrap 15 is worn around the wrist.

To use the eyewear protector and wrist wrap as an eyewear protector we begin with the device as it was presented in FIG. 8.

Figure 13:
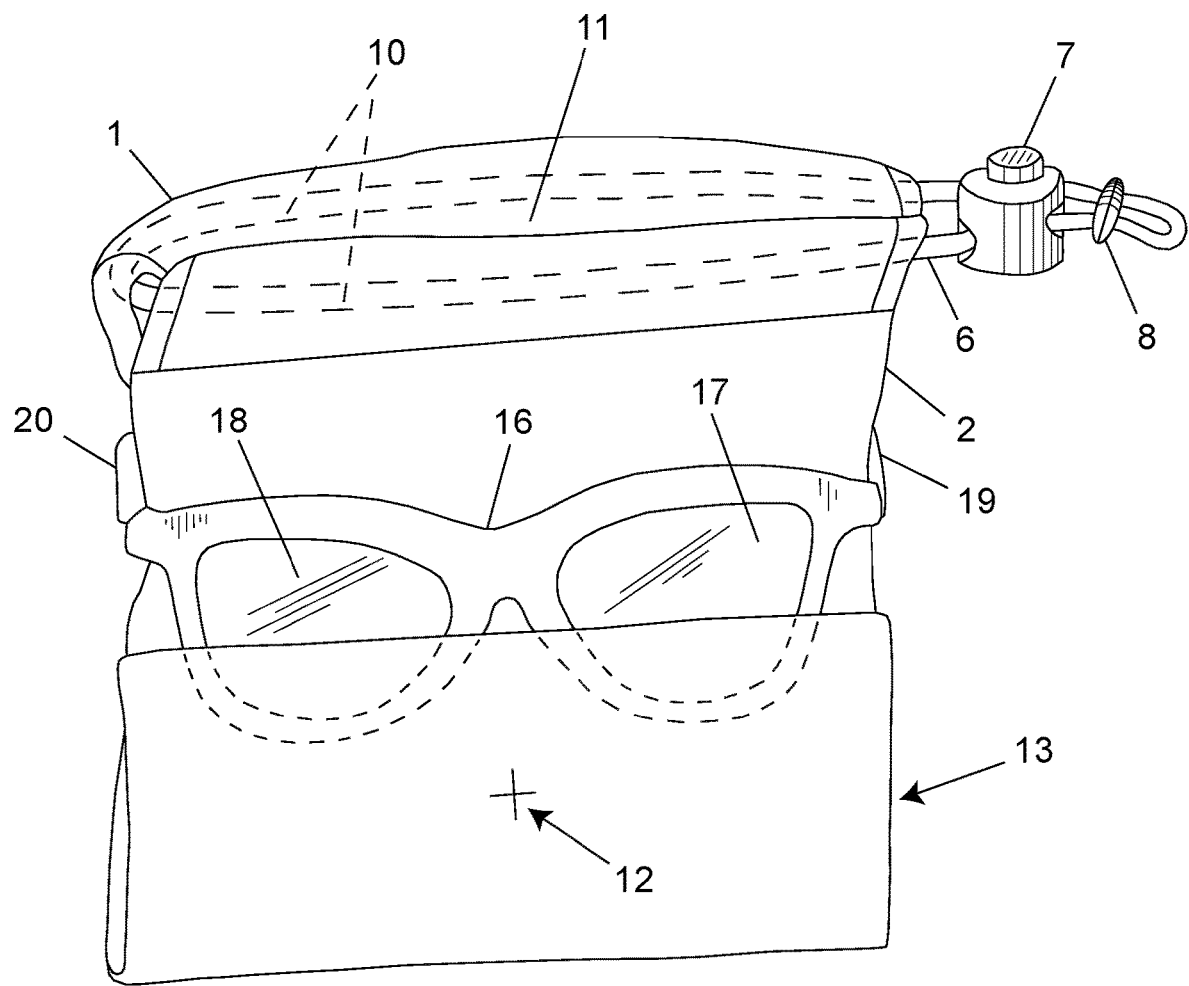
FIG. 13 is a perspective view showing how eyewear is placed into the receptacle created by the folded and attached portion of the sheets of fabric which contains the strip of fabric as was presented in FIG. 8.

FIG. 13 shows that the process of placing and protecting eyewear in the eyewear protector and wrist wrap begins by introducing pair of eyewear 16 containing first lens 17 and second lens 18 with connected first temple piece 19 and second temple piece 20 into receptacle 13.

Figure 14:
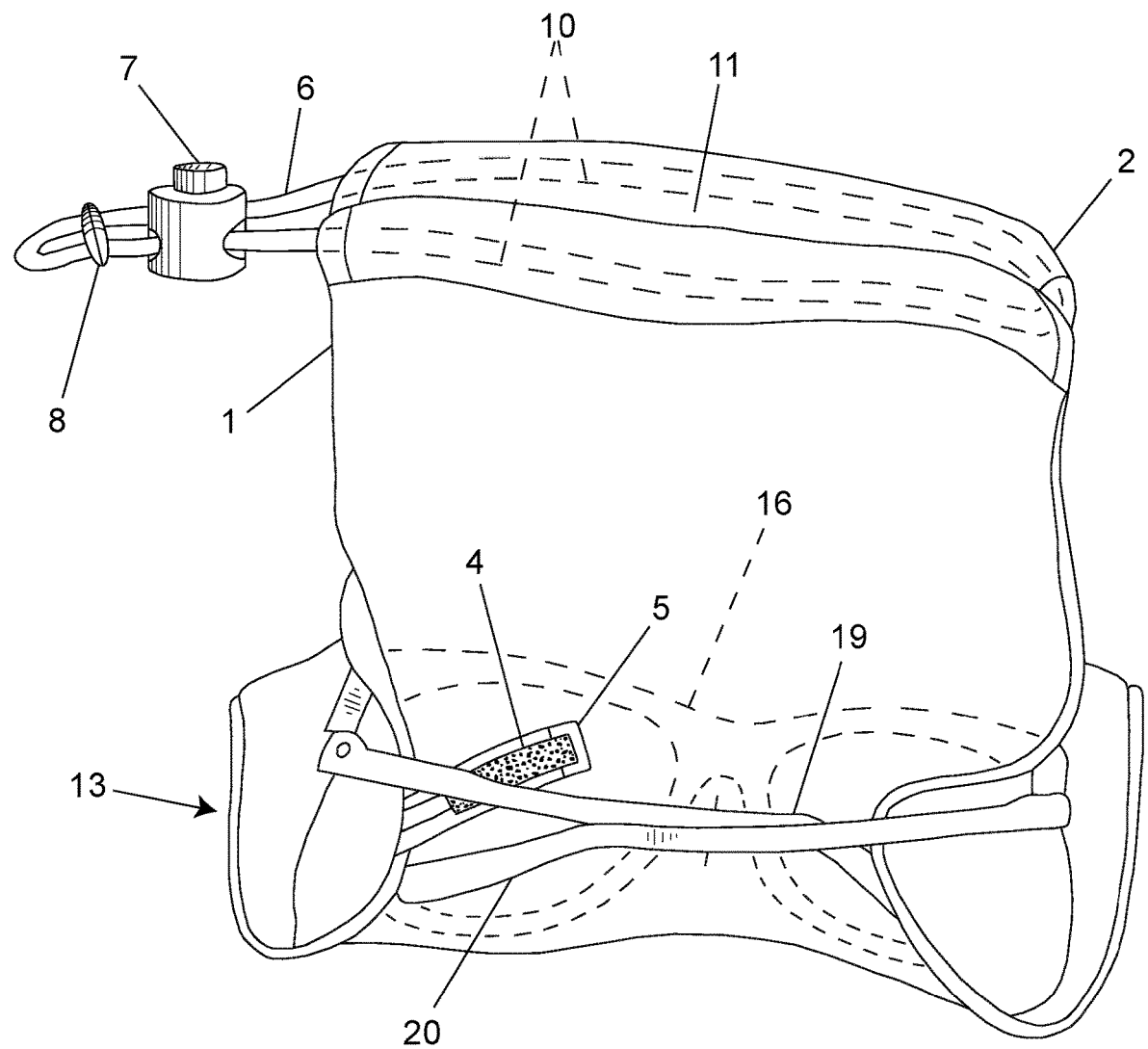
FIG. 14 is a perspective view showing the eyewear being held in the eyewear protector with the eyewear temple pieces in a folded position and prevented from coming into contact with the interior surface of the eyewear lenses.

FIG. 14 shows the other side of FIG. 13 when the eyewear is placed fully within receptacle 13. First temple piece 19 and second temple piece 20 are folded behind first sheet of fabric 1 and are prevented from coming into contact with the lenses by first sheet of fabric 1 and second sheet of fabric 2 which form the main body of the eyewear protector and wrist wrap. In this way any possible scratching of the eyewear lenses produced by the eyewear temple pieces is prevented.

FIG. 15 shows the front side of FIG. 14 when pair of eyewear 16 is placed fully within the eyewear protector and wrist wrap. FIG. 16 is a sectional view of FIG. 15 taken generally along the line 16-16 that reinforces visually the position of pair of eyewear 16 along with first temple piece 19 and second temple piece 20 in relation to the components of the eyewear protector and wrist wrap. Here again we see strip of fabric 9 between first sheet of fabric 1 and second sheet of fabric 2 forming part of receptacle 13.

FIG. 17 shows the culmination of steps that have transformed the eyewear protector and wrist wrap into eyewear protector 21 by fully enclosing pair of eyewear 16 along with first temple piece 19 and second temple piece 20 in a protective package. Looking at FIG. 15 again, we can see that the component containing elastic cord 14 was turned inside out and pulled down and over receptacle 13 which contains pair of eyewear 16.

FIG. 18 shows a sectional view of FIG. 17 taken generally along the line 18-18. When comparing the images of FIG. 16 and FIG. 18 it is possible to see the movement of first sheet of fabric 1 and second sheet of fabric 2 as well as elastic cord 6 in a way that completely envelops pair of eyewear 16.

Figure 19:
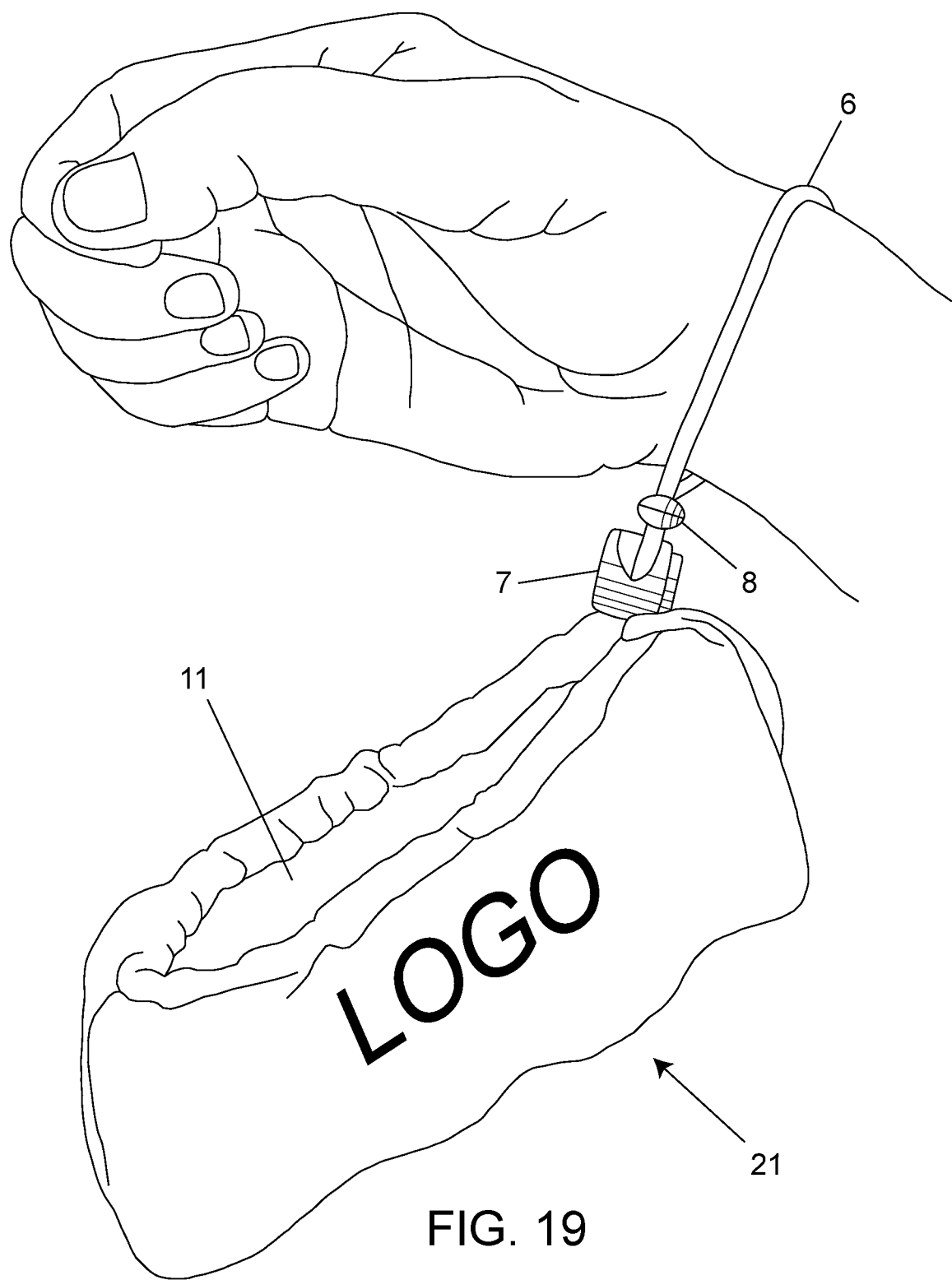
FIGS. 19 and 20 are perspective views showing the eyewear protector containing the eyewear being worn with the aid of the elastic cord about the wrist as well as from a pant belt loop by utilizing a carabiner.

FIG. 19 shows that utilizing cord lock 7 on elastic cord 6 of eyewear protector 21, opening 11 (which now exists in an inside out form) can be closed to secure the pair of eyewear. This is accomplished by drawing cord lock 7 along elastic cord 6 into contact with the package containing the eyewear to effectively close opening 11. It is necessary to state that alternative closure devices such as snaps, buttons, zippers and the like may be utilized. The position of cord lock 7 and double barrel slider 8 on elastic cord 6 can be adjusted in a manner that allows the packaged eyewear to be worn securely from a wrist. It is important to note that the logos which were placed on the sides of first sheet of fabric 1 and second sheet of fabric 2 with the hemmed edges (as was presented in FIG. 2 and FIG. 3) are now visible in this function of the device. FIG. 19 shows one of these logos and FIG. 20 shows the other.

Figure 20:
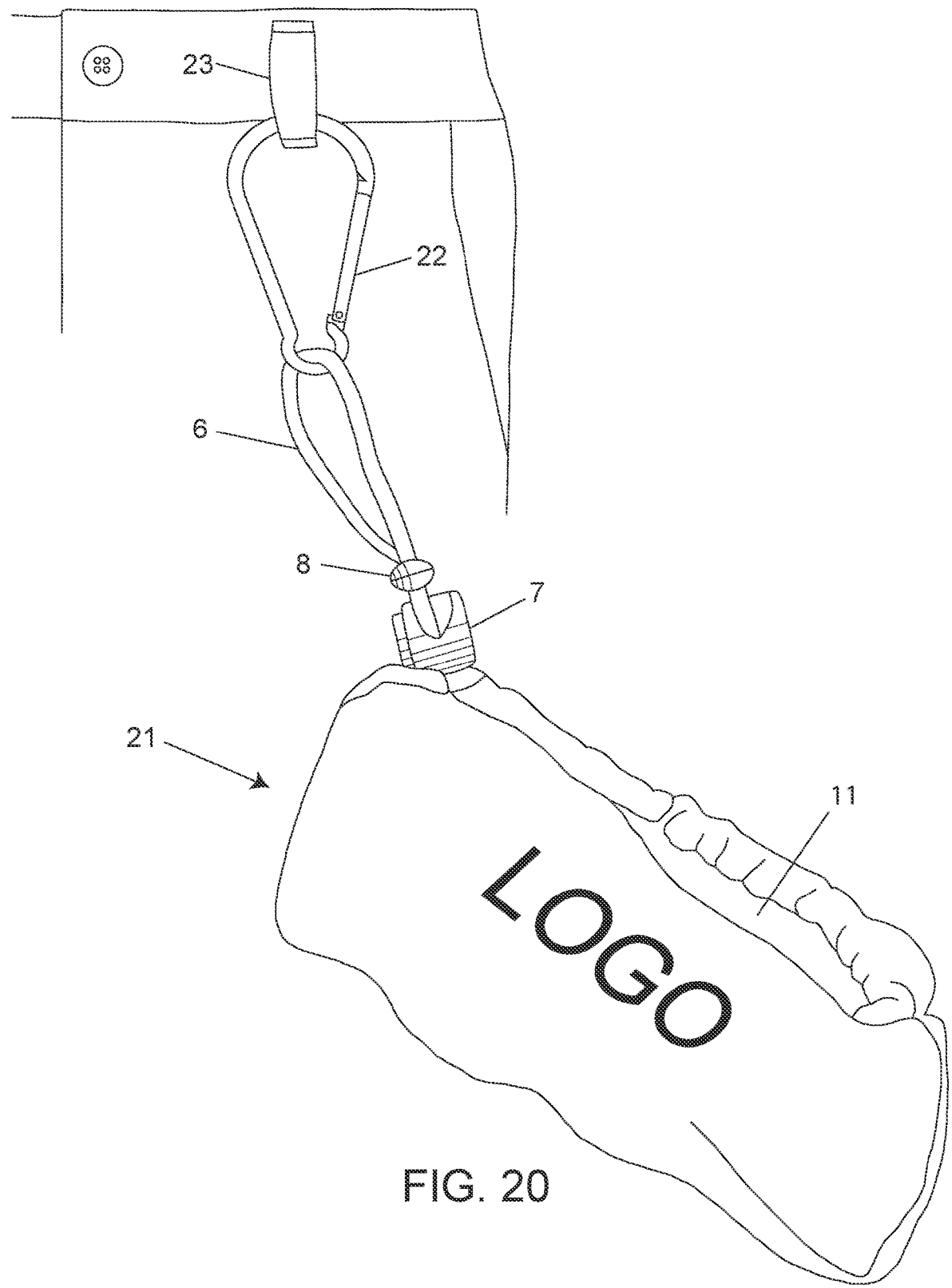

FIG. 20 shows another way to keep eyewear protector 21 which contains a pair of eyewear close at hand without the requirement for a pocket or a bag to store it in. In this case free end of elastic cord 6 is placed within carabiner 22 and carabiner 22 is clasped onto pant belt loop 23. In this manner any pair of eyewear contained within the eyewear protector can hang from a pant belt loop and be readily available when needed.

Figure 21:
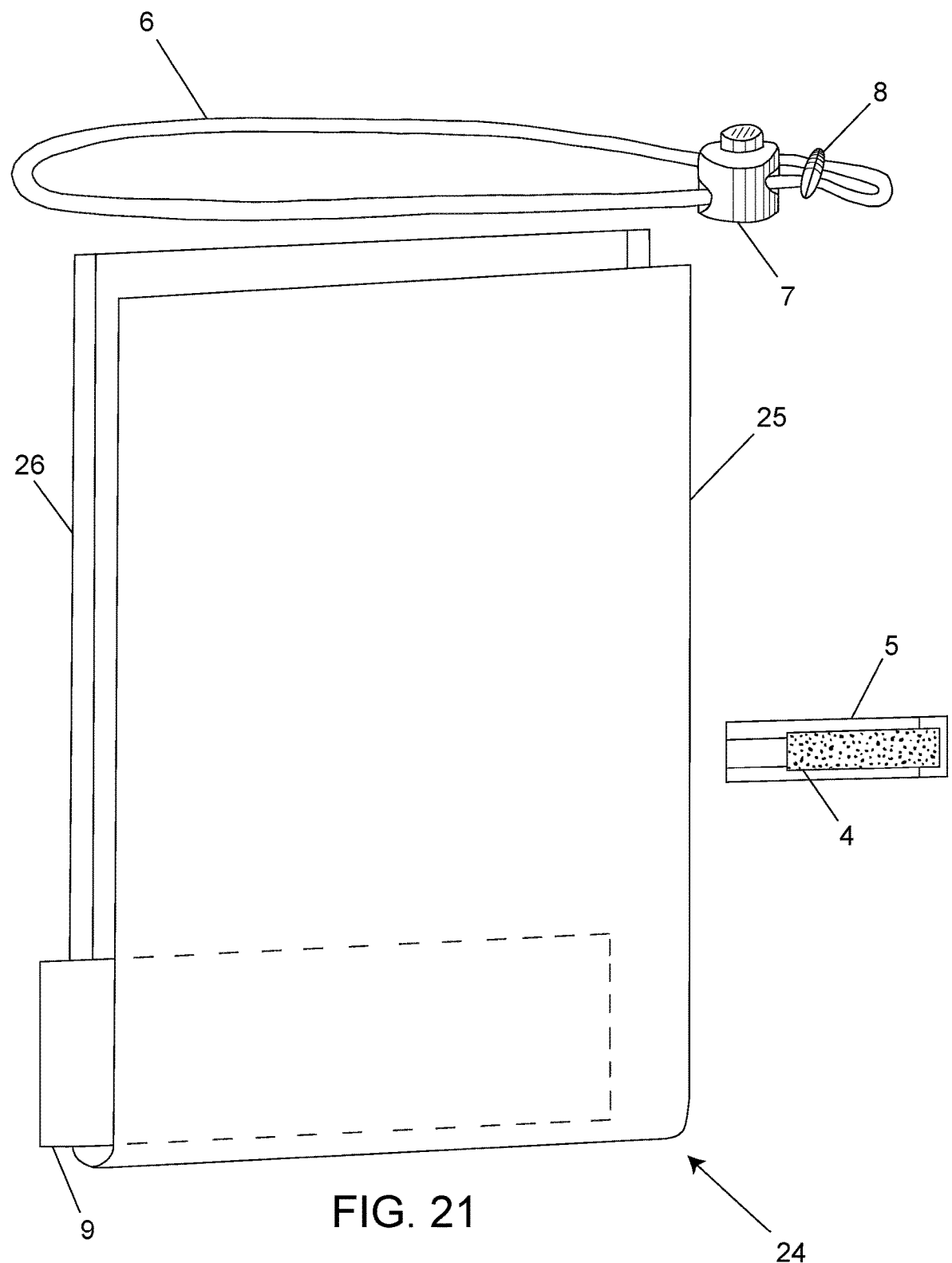
FIG. 21 is a perspective view showing a second embodiment of the device which utilizes one sheet of fabric for its construction.
Figure 22:
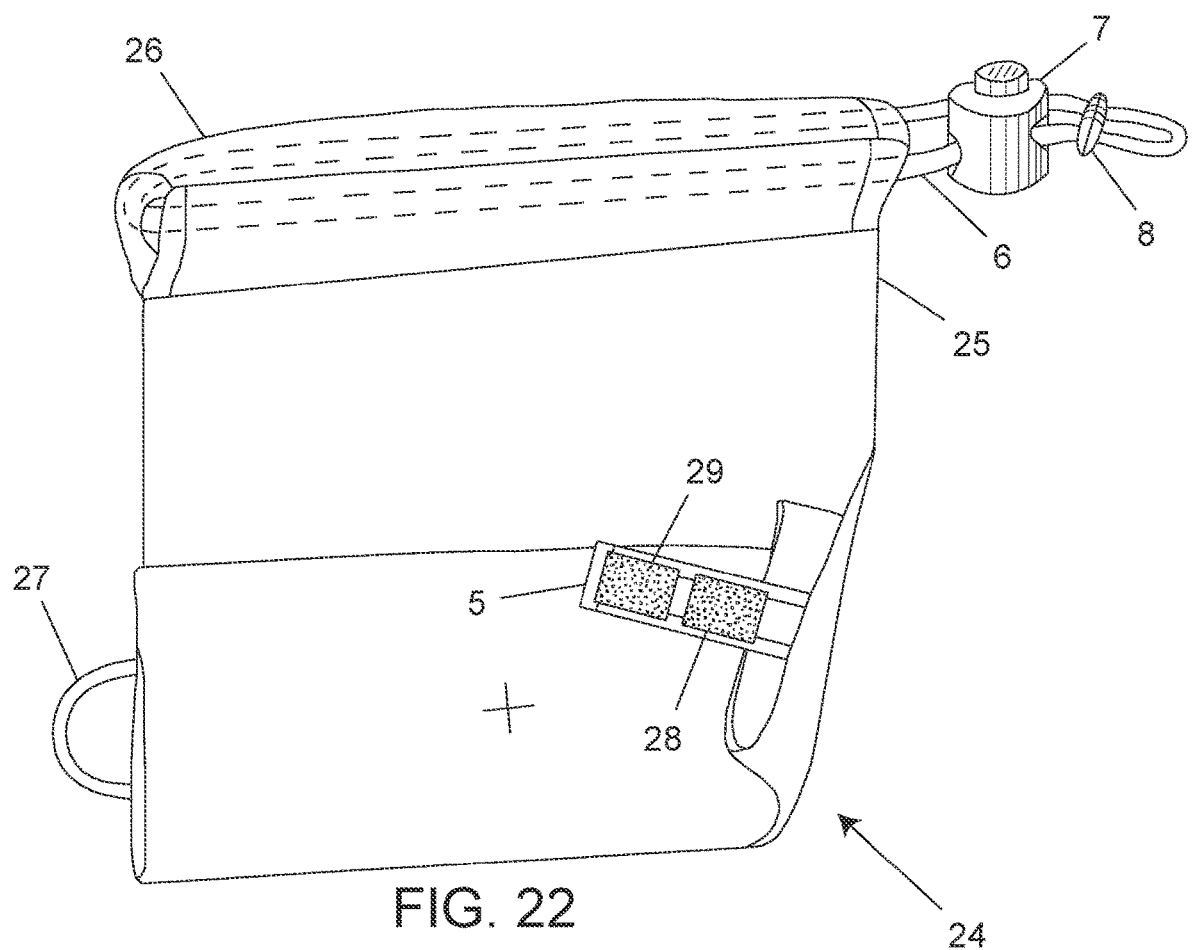
FIGS. 22 to 27 are perspective views of the device presented in FIG. 21 utilizing wrist wrap strap and fastener elements which are alternatives to those already presented. In addition, an alternative form of attaching the folded portion which contains the strip of fabric to create a receptacle is presented.
Figure 23:
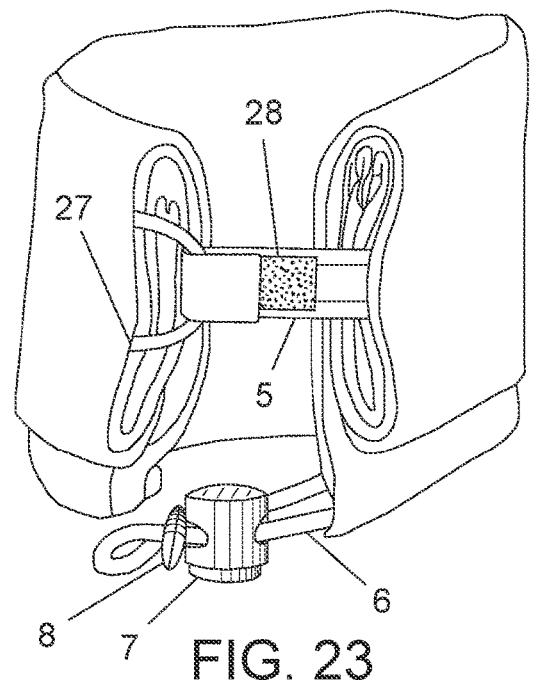

FIGS. 21 to 28 show variations in the construction of the eyewear protector and wrist wrap as well as in the elements that allow the wrist wrap to be held around the wrist and those that allow the eyewear protector which contains a pair of eyewear to be held from a pant belt loop. FIG. 21 shows a second embodiment of the eyewear protector and wrist wrap that utilizes singular sheet of fabric 24 for its construction. In this embodiment strip of fabric 9 is introduced between the front fabric panel 25 and the rear fabric panel 26 of singular sheet of fabric 24. FIG. 22 shows a completed eyewear protector and wrist wrap constructed from singular sheet of fabric 24 that employs two fasteners, alternative first fastener 28 which is engageable to alternative second fastener 29 and both are attached on the side of strap 5 that faces to the rear, strap 5 in turn is attached between front fabric panel 25 and rear fabric panel 26. Additionally, elastic cord loop 27 is attached between front fabric panel 25 and rear fabric panel 26 on the side opposite to the side with strap 5. In FIG. 23 when the device is being used as a wrist wrap with these alternative elements, strap 5 is passed through elastic cord loop 27 and then pulled back and over elastic cord loop 27 after which the fasteners are brought into contact and engage with each other. The result is that the wrist wrap can be secured around a wrist.

Figure 24:
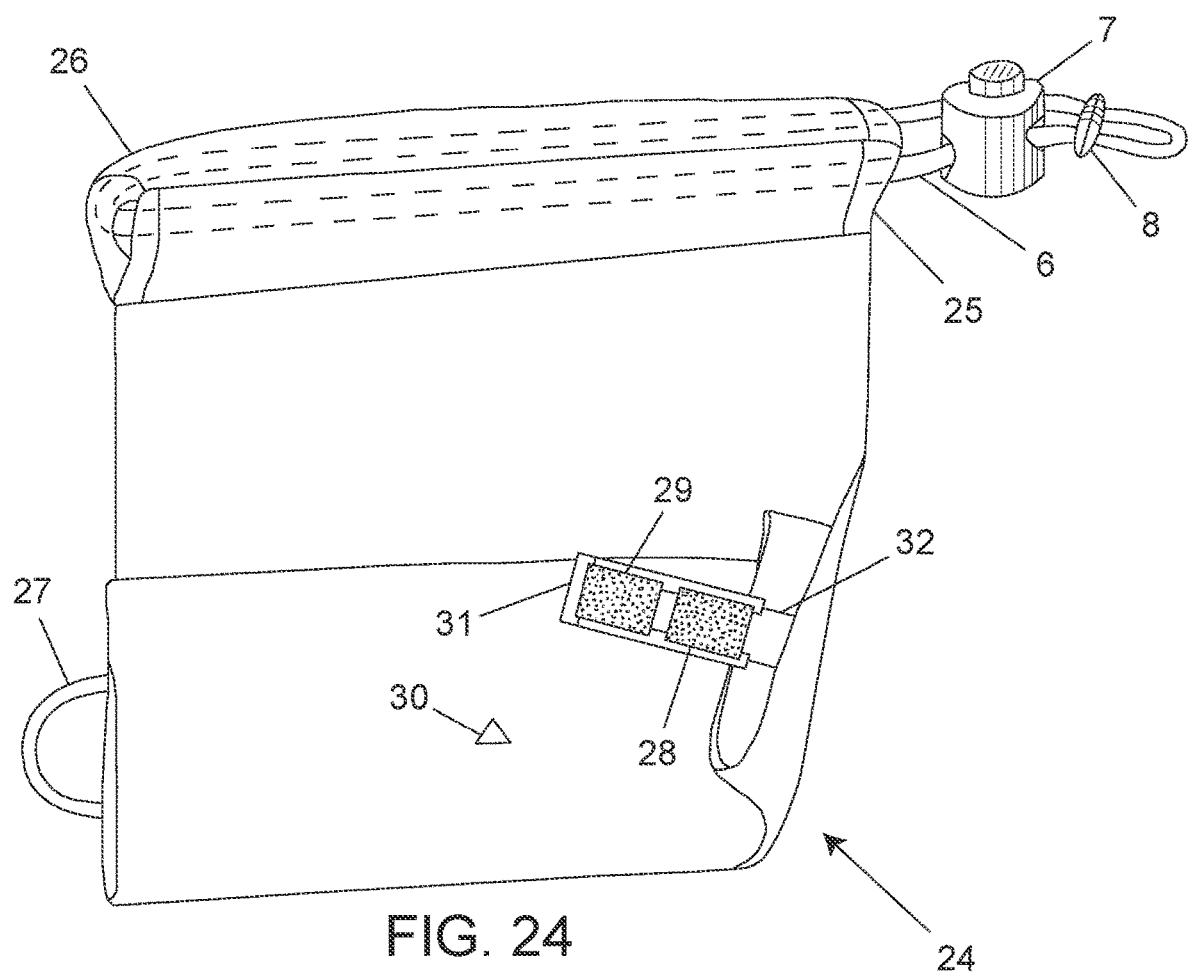
Figure 25:
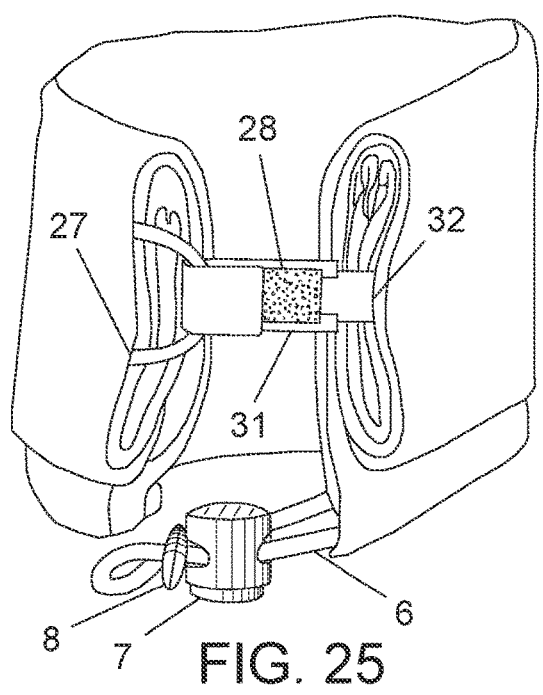

FIG. 24 shows another option when creating a receptacle on an eyewear protector and wrist wrap constructed from singular sheet of fabric 24. In this option the folded portion which forms a receptacle to be used for the introduction of eyewear is attached through all fabric layers at alternative fold attachment 30 which is in the shape of a triangle. The way in which this folded component is attached can be quite variable and in no way should the attachment shown in any figure be understood to mean that, that is the sole way in which it will be carried out. Also of importance here is that alternative strap 31 with alternative first fastener 28 which is engageable to alternative second fastener 29 is attached to elastic band 32 and this elastic band is attached between front fabric panel 25 and rear fabric panel 26 of singular sheet of fabric 24. Alternative first fastener 28 and alternative second fastener 29 are both attached to alternative strap 31 facing to the rear and elastic cord loop 27 is attached between front fabric panel 25 and rear fabric panel 26 on the side opposite to the side with alternative strap 31. FIG. 25 shows that when alternative strap 31 which is attached to elastic band 32 is passed through elastic cord loop 27 and then pulled back and over elastic cord loop 27 and the fasteners are brought into contact and engage with each other the result is that the wrist wrap can be secured around a wrist. The elasticity of elastic band 32 allows the movement of alternative strap 31 and this along with the elasticity of elastic cord loop 27 will allow the wrist wrap to accommodate wrists of varying thickness.

Figure 26:
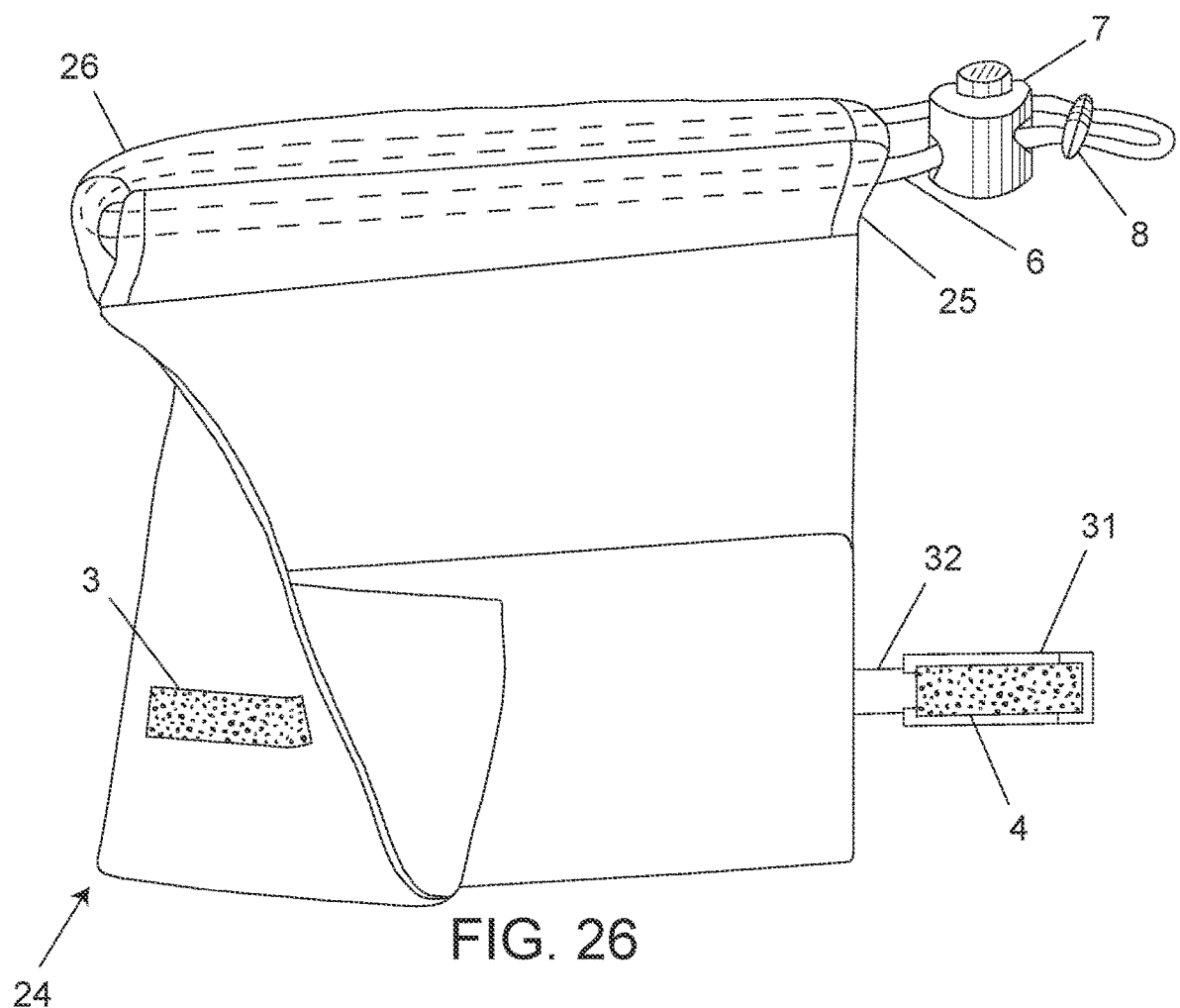
Figure 27:
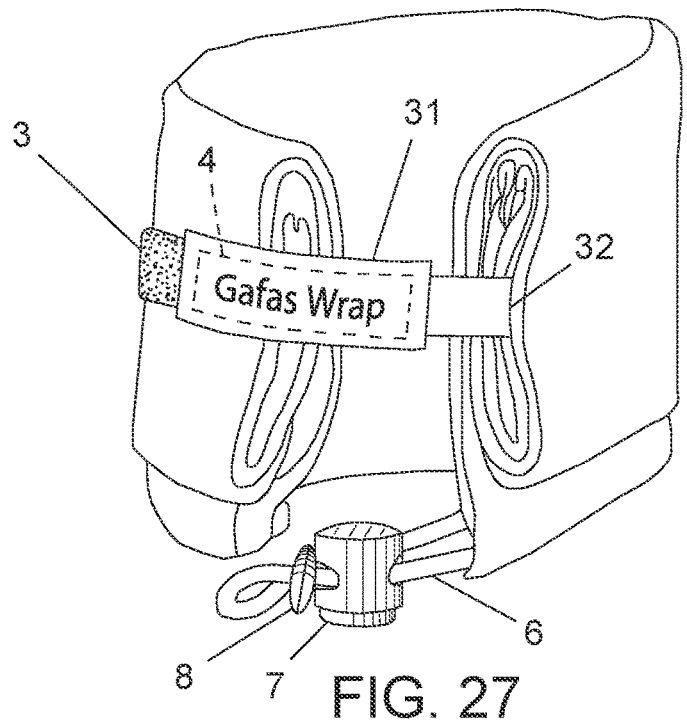

FIG. 26 illustrates another strap arrangement that can also adapt to accommodate wrists of varying thickness. In this arrangement alternative strap 31 with second fastener 4 is attached to elastic band 32 and elastic band 32 in turn is attached between rear fabric panel 26 and front fabric panel 25 of singular sheet of fabric 24. Second fastener 4 is engageable to first fastener 3 which is attached to rear fabric panel 26 of singular sheet of fabric 24. FIG. 27 shows how the addition of elastic band 32 functions. Elastic band 32 will stretch to accommodate wrists of varying thickness and when second fastener 4 is brought into contact and engaged with first fastener 3 the result is that the wrist wrap can be secured around a wrist.

FIG. 28 shows that when the device contains eyewear and is therefore being utilized as an eyewear protector it can be hung from pant belt loop 23 in a way that eliminates the need for a carabiner. This method of hanging the eyewear protector from pant belt loop 23 would utilize pant belt loop strap 33. Pant belt loop strap 33 would be looped around elastic cord 6 and would be attached onto itself in a manner that allows it to slide freely along elastic cord 6. FIG. 29 shows that pant belt loop strap 33 has pant belt loop strap first fastener 34 which is engageable to pant belt loop strap second fastener 35 and both fasteners are attached on one side of pant belt loop strap 33. When pant belt loop strap 33 is looped around pant belt loop 23 and pant belt loop strap first fastener 34 is brought into contact and engaged with pant belt loop strap second fastener 35 the result is that the eyewear protector and the eyewear it contains is hung from pant belt loop 23 as shown in FIG. 28.

FIG. 30 shows that alternative pant belt loop strap 36 has pant belt loop strap first fastener 34 which is engageable to pant belt loop strap second fastener 35 and both fasteners are attached on one side of alternative pant belt loop strap 36. This pant belt loop strap option would not be attached around elastic cord 6 but would instead be placed onto it by looping it around elastic cord 6 and inserting one end of alternative pant belt loop strap 36 through the integrated alternative pant belt loop strap eyelet 37. In this manner alternative pant belt loop strap 36 can be placed onto elastic cord 6 or removed from it with ease. Alternative pant belt loop strap 36 functions just like pant belt loop strap 33, allowing the eyewear protector containing eyewear to hang from pant belt loop 23 when it is looped around it and pant belt loop strap first fastener 34 is brought into contact and engaged with pant belt loop strap second fastener 35.

Figure 31:
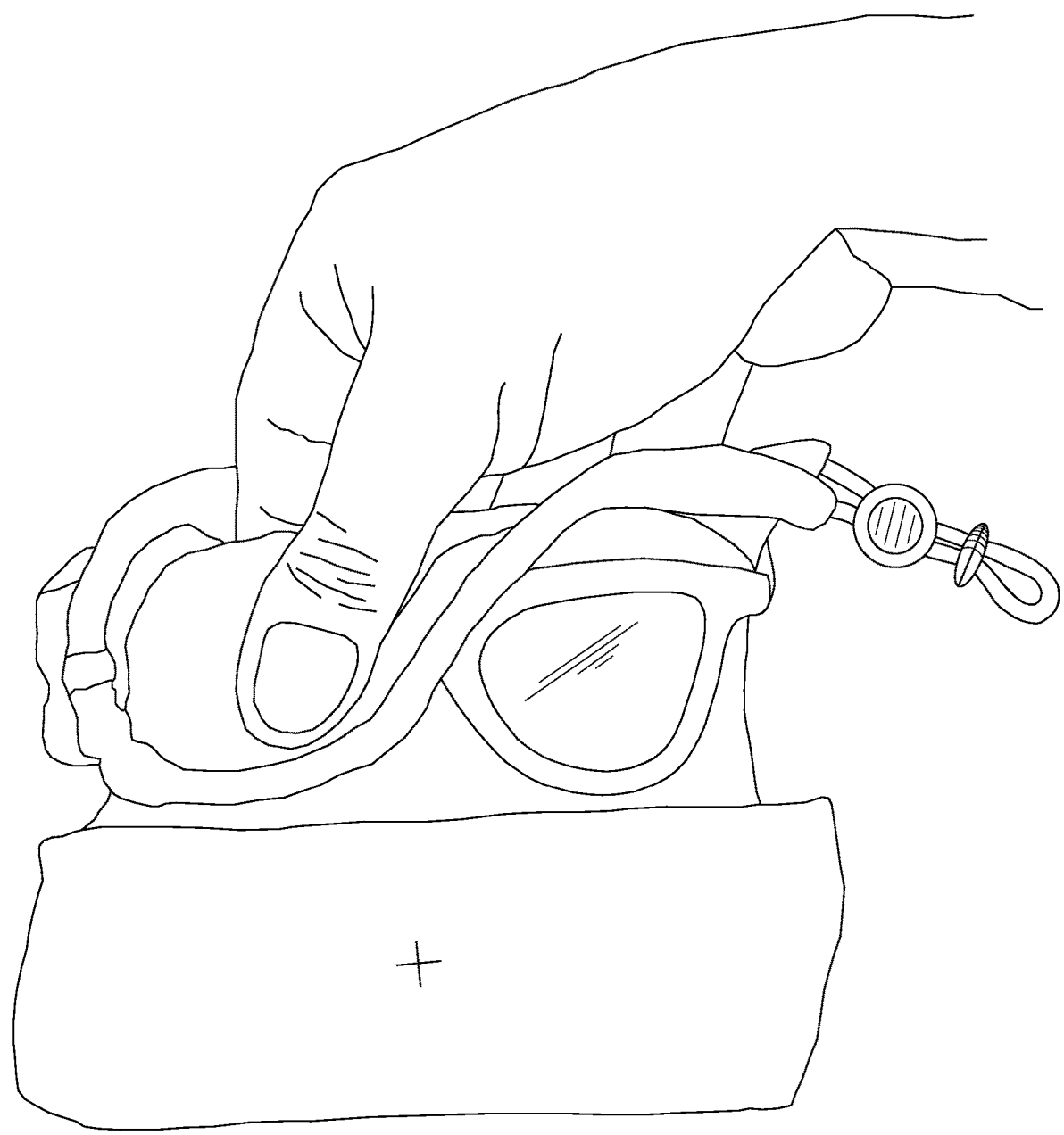
FIG. 31 is a perspective view showing a method for cleaning the eyewear lenses.

FIG. 31 illustrates one possible method for cleaning eyewear. This method for cleaning eyewear involves first inserting a hand into the eyewear protector and wrist wrap opening an continuing into to the pocket and then placing the eyewear onto the sheet of fabric on the palm side of the hand. The thumb would fold down the top edge of this sheet of fabric and bring about contact of fabric with the lenses on both sides. The ensuing movement of the thumb and forefinger would clean the lenses.

It is my desire that "Velcro" fasteners be used in the preferred design of the eyewear protector and wrist wrap; however alternative fastening elements may be used such as snaps, buttons, hook and loops and the like. It is also important to state that the various combinations of strap elements may be used as set forth or individual elements may be brought together in various ways so as to create novel strap arrangements. That is to say an element in a given strap may be used with or on another strap other than the one it was presented with and the arrangement of individual elements, their dimensions, and their placement can be varied in any myriad of ways. The placement of logos may be accomplished in any manner known and available in the art.

While the eyewear protector and wrist wrap has been shown and described it will be appreciated by those skilled in the art that this disclosure is made by way of example and is not intended to limit the scope of this invention. The scope of patent protection afforded the present invention is determined only by the appended claims.

I claim:

1. In combination, an eyewear protector and wrist wrap for holding eyewear of the type having a frame, lenses and a pair of temple pieces coupled to the frame, comprising:
   means for selectively protecting eyewear including the frame and temple pieces wherein the protecting means is constructed from two sheets of fabric that are attached along their edges, while an edge of the sheets is unattached and forms an opening that leads to a pocket that can be turned inside out and pulled down and over a receptacle into which eyewear may be introduced that is constructed by placing and attaching a strip of fabric between both sheets of fabric along the edge opposite the opening and then folding up and attaching this edge through all fabric layers;
   means for selectively closing the opening leading to the pocket to prevent eyewear from escaping the protective means, the closing means allowing for wearing the protective means which holds eyewear from a wrist;
   means for hanging the protective means which holds eyewear from a pant belt loop;
   means for wearing the eyewear protector about a wrist, as a wrist wrap when not protecting eyewear.

2. The combination defined in claim 1, wherein the closing means includes a double barrel slider and a clamp slidably received along a cord and into contact with the protective means, said cord is introduced along a seam created by folding each edge of each sheet at the opening down and over the cord and attaching each edge onto its corresponding sheet allowing said cord to move freely within the seam created as well as be looped around a wrist and the position of said clamp and said double barrel slider be adjusted to hang said eyewear protector which holds eyewear from a wrist and wherein a strap having fasteners attached is slidably received along said cord and can be looped around a pant belt loop and said fasteners brought into contact with each other and engaged with each other thereby allowing said eyewear protector which holds eyewear to hang from a pant belt loop.

3. The combination defined in claim 1, wherein the protective means includes an open-ended pocket.

4. The combination defined in claim 1, wherein the means for wearing said eyewear protector about a wrist, as a wrist wrap, includes a strap with a fastener that is attached between both sheets of fabric and said strap is disposed to allow said fastener to contact and engage with a fastener attached to one of the sheets of fabric.

5. The combination defined in claim 1, wherein both sides of said sheets of fabric have logos, arts or other decorative patterns placed onto them.

6. The combination defined in claim 1, wherein the means for wearing said eyewear protector about the wrist as a wrist wrap includes a strap with fasteners and this strap is attached between both sheets of fabric and is disposed to allow it to pass through a loop located across from it, after which said fasteners are brought into contact and engaged with each other.

7. The combination defined in claim 1, wherein the means for wearing said eyewear protector about the wrist, as a wrist wrap, includes a stretchable band attached between both sheets of fabric, to said stretchable band is then attached a strap with fasteners and this contiguous arrangement of elements is disposed to allow it to pass through a loop located across from it, after which said fasteners are brought into contact and engaged with each other.

8. The combination defined in claim 1, wherein the means for wearing said eyewear protector about the wrist, as a wrist wrap, includes a stretchable band attached between both sheets of fabric, to said stretchable band is then attached a strap with a fastener and this contiguous arrangement of elements is disposed to allow said fastener to contact and engage with a fastener attached to one of the sheets of fabric.

9. In combination, an eyewear protector and wrist wrap device for selectively protecting eyewear of the type having a frame, lenses and a pair of temple pieces coupled to the frame, comprising:
- a protector configured to selectively enclose eyewear including the frame and temple pieces, that is constructed from a singular sheet of fabric which is folded along a midpoint, a strip of fabric is introduced and attached within this fold and meeting edges of the sheet are attached to each other while the edges opposite the edge containing the strip of fabric are left unattached and form an opening that leads to a pocket, the edge with the strip of fabric is folded up and attached through all fabric layers forming a receptacle into which eyewear may be introduced and the pocket can be turned inside out and pulled down and over the receptacle which holds the eyewear;
- a closure cooperating with the eyewear protector to close the opening along the unattached edges and thereby selectively preventing removal of the eyewear.

10. The device of claim 9, wherein the closure includes a double strand slider and a cord lock slidably received along a cord and into contact with the protector, the cord is introduced along a seam created by folding the edge of each panel of the singular sheet of fabric at the opening down and over the cord and attaching each edge onto its corresponding panel allowing the cord to move freely within the seam created as well as to be looped around a wrist, and the position of the double strand slider and cord lock to be adjusted to hang the protector which holds eyewear from a wrist and wherein a strap having fasteners attached is slidably received along the cord and can be looped around a pant belt loop and the fasteners brought into contact and engaged with each other thereby allowing the eyewear protector which holds eyewear to hang from a pant belt loop.

11. The device of claim 9, wherein the protector includes an open ended pocket.

12. The device of claim 9, wherein a strap with a fastener is attached between the panels of the singular sheet of fabric and this strap is disposed to allow its fastener to contact and engage with the fastener attached to one of the panels of the singular sheet of fabric, thereby allowing the device to be worn as a wrist wrap.

13. The device of claim 9, wherein both sides of the panels of the singular sheet of fabric have logos, arts or other decorative patterns placed onto them.

14. The device of claim 9, wherein the wrist wrap includes a strap with fasteners and this strap is attached between the panels of the singular sheet of fabric and is disposed to allow it to pass through a loop located across from it, after which the fasteners are brought into contact and engaged with each other, thereby allowing the device to be worn as a wrist wrap.

15. The device of claim 9, wherein the wrist wrap includes a stretchable band attached between the panels of the singular sheet of fabric, to this stretchable band is then attached a strap with fasteners and this contiguous arrangement of elements is disposed to allow it to pass through a loop located across from it, after which the fasteners are brought into contact and engaged with each other, thereby allowing the device to be worn as a wrist wrap.

16. The device of claim 9, wherein the wrist wrap includes a stretchable band attached between the panels of the singular sheet of fabric, to this stretchable band is then attached a strap with a fastener and this contiguous arrangement of elements is disposed to allow the fastener to contact and engage with a fastener attached to one of the panels of the singular sheet of fabric, thereby allowing the device to be worn as a wrist wrap.

\* \* \* \* \*